(12) United States Patent
Adams et al.

(10) Patent No.: US 9,908,200 B2
(45) Date of Patent: *Mar. 6, 2018

(54) APPARATUS AND METHOD OF IMPROVING BEAM SHAPING AND BEAM HOMOGENIZATION

(71) Applicant: Applied Materials, Inc., Santa Clara, CA (US)

(72) Inventors: Bruce E. Adams, Portland, OR (US); Samuel C. Howells, Portland, OR (US); Dean Jennings, Beverly, MA (US); Jiping Li, Palo Alto, CA (US); Timothy N. Thomas, Portland, OR (US); Stephen Moffatt, St. Brelade (JE)

(73) Assignee: APPLIED MATERIALS, INC., Santa Clara, CA (US)

(*) Notice: Subject to any disclaimer, the term of this patent is extended or adjusted under 35 U.S.C. 154(b) by 106 days.

This patent is subject to a terminal disclaimer.

(21) Appl. No.: 14/480,415

(22) Filed: Sep. 8, 2014

(65) Prior Publication Data

US 2015/0053658 A1 Feb. 26, 2015

Related U.S. Application Data

(60) Continuation of application No. 13/401,553, filed on Feb. 21, 2012, now Pat. No. 8,829,392, which is a
(Continued)

(51) Int. Cl.
*B23K 26/02* (2014.01)
*B23K 26/06* (2014.01)
(Continued)

(52) U.S. Cl.
CPC .......... *B23K 26/073* (2013.01); *B23K 26/067* (2013.01); *B23K 26/0613* (2013.01);
(Continued)

(58) Field of Classification Search
CPC ............ B23K 26/0604; B23K 26/0613; B23K 26/0622; B23K 26/063; B23K 26/067;
(Continued)

(56) References Cited

U.S. PATENT DOCUMENTS 3,633,999 A   1/1972  Buckles
4,439,245 A   3/1984  Wu
(Continued)

FOREIGN PATENT DOCUMENTS

EP   1708008 A1   10/2006

OTHER PUBLICATIONS

Rudge, et al.; IBM Journal; Fly's-Eye Lens Technique for Generating Semiconductor Device Fabrication Masks dated Apr. 1963; 5 total pages.
(Continued)

*Primary Examiner* — Sang Y Paik
(74) *Attorney, Agent, or Firm* — Patterson + Sheridan LLP

(57) ABSTRACT

The present invention generally relates to an optical system that is able to reliably deliver a uniform amount of energy across an anneal region contained on a surface of a substrate. The optical system is adapted to deliver, or project, a uniform amount of energy having a desired two-dimensional shape on a desired region on the surface of the substrate. Typically, the anneal regions may be square or rectangular in shape. Generally, the optical system and methods of the present invention are used to preferentially anneal one or more regions found within the anneal regions by delivering enough energy to cause the one or more regions to re-melt and solidify.

20 Claims, 17 Drawing Sheets

Related U.S. Application Data division of application No. 11/888,433, filed on Jul. 31, 2007, now Pat. No. 8,148,663.

(51) Int. Cl.
 *B23K 26/073* (2006.01)
 *B23K 26/067* (2006.01)
 *G02B 27/09* (2006.01)
 *B23K 26/0622* (2014.01)
 *B23K 103/00* (2006.01)

(52) U.S. Cl.
 CPC ...... *B23K 26/0622* (2015.10); *B23K 26/0732* (2013.01); *G02B 27/0961* (2013.01); *B23K 2203/56* (2015.10)

(58) Field of Classification Search
 CPC .............. B23K 26/073; B23K 26/0732; G02B 27/0961
 USPC .......................................... 219/121.6–121.84
 See application file for complete search history.

(56) References Cited

U.S. PATENT DOCUMENTS

| | | |
|---|---|---|
| 4,475,027 A | 10/1984 | Pressley |
| 4,511,220 A | 4/1985 | Scully |
| 4,619,508 A | 10/1986 | Shibuya et al. |
| 4,744,615 A | 5/1988 | Fan et al. |
| 4,849,371 A | 7/1989 | Hansen et al. |
| 4,851,978 A | 7/1989 | Ichihara |
| 5,061,025 A | 10/1991 | Debesis |
| 5,109,465 A | 4/1992 | Klopotek |
| 5,224,200 A | 6/1993 | Rasmussen et al. |
| 5,233,460 A | 8/1993 | Partlo et al. |
| 5,307,207 A | 4/1994 | Ichihara |
| 5,315,427 A | 5/1994 | Rauch et al. |
| 5,328,785 A | 7/1994 | Smith et al. |
| 5,357,365 A | 10/1994 | Ipposhi et al. |
| 5,453,814 A | 9/1995 | Aiyer |
| 5,463,200 A | 10/1995 | James et al. |
| 5,561,081 A | 10/1996 | Takenouchi et al. |
| 5,591,668 A | 1/1997 | Maegawa et al. |
| 5,610,733 A | 3/1997 | Feldman et al. |
| 5,621,529 A | 4/1997 | Gordon et al. |
| 5,662,410 A | 9/1997 | Suganuma |
| 5,699,191 A | 12/1997 | Fork |
| 5,754,278 A | 5/1998 | Kurtz |
| 5,888,888 A | 3/1999 | Talwar et al. |
| 5,956,603 A | 9/1999 | Talwar et al. |
| 6,022,101 A | 2/2000 | Sabonis |
| 6,038,075 A | 3/2000 | Yamazaki et al. |
| 6,080,965 A | 6/2000 | Osawa |
| 6,191,887 B1 | 2/2001 | Michaloski et al. |
| 6,212,012 B1 | 4/2001 | Tanaka |
| 6,215,595 B1 | 4/2001 | Yamazaki et al. |
| 6,239,913 B1 | 5/2001 | Tanaka |
| 6,274,488 B1 | 8/2001 | Talwar et al. |
| 6,291,320 B1 | 9/2001 | Yamazaki et al. |
| 6,297,135 B1 | 10/2001 | Talwar et al. |
| 6,300,208 B1 | 10/2001 | Talwar et al. |
| 6,303,476 B1 | 10/2001 | Hawryluk et al. |
| 6,310,727 B1 | 10/2001 | Tanaka |
| 6,324,195 B1 | 11/2001 | Suzuki et al. |
| 6,348,076 B1 | 2/2002 | Canaperi et al. |
| 6,365,476 B1 | 4/2002 | Talwar et al. |
| 6,366,308 B1 | 4/2002 | Hawryluk et al. |
| 6,376,806 B2 | 4/2002 | Yoo |
| 6,383,956 B2 | 5/2002 | Hawryluk et al. |
| 6,387,803 B2 | 5/2002 | Talwar et al. |
| 6,388,297 B1 | 5/2002 | Talwar et al. |
| 6,388,812 B2 | 5/2002 | Yamazaki et al. |
| 6,420,264 B1 | 7/2002 | Talwar et al. |
| 6,441,965 B2 | 8/2002 | Yamazaki et al. |
| 6,479,821 B1 | 11/2002 | Hawryluk et al. |
| 6,495,390 B2 | 12/2002 | Hawryluk et al. |
| 6,515,257 B1 | 2/2003 | Jain et al. |
| 6,545,248 B2 | 4/2003 | Tanaka et al. |
| 6,570,656 B1 | 5/2003 | Owens, Jr. et al. |
| 6,577,429 B1 | 6/2003 | Kurtz et al. |
| 6,587,277 B2 | 7/2003 | Yamazaki et al. |
| 6,594,090 B2 | 7/2003 | Kruschwitz et al. |
| 6,597,430 B1 | 7/2003 | Nishi et al. |
| 6,635,541 B1 | 10/2003 | Talwar et al. |
| 6,635,588 B1 | 10/2003 | Hawryluk et al. |
| 6,645,838 B1 | 11/2003 | Talwar et al. |
| 6,685,319 B2 | 2/2004 | Watson et al. |
| 6,717,105 B1 | 4/2004 | Okamoto et al. |
| 6,728,039 B2 | 4/2004 | Tanaka |
| 6,747,245 B2 | 6/2004 | Talwar et al. |
| 6,750,424 B2 | 6/2004 | Tanaka |
| 6,759,628 B1 | 7/2004 | Ino et al. |
| 6,774,340 B1 | 8/2004 | Chiba et al. |
| 6,777,317 B2 | 8/2004 | Seibel et al. |
| 6,825,101 B1 | 11/2004 | Hawryluk et al. |
| 6,835,675 B2 | 12/2004 | Yamazaki et al. |
| 6,841,787 B2 | 1/2005 | Almogy |
| 6,844,250 B1 | 1/2005 | Wang et al. |
| 6,849,831 B2 | 2/2005 | Timans et al. |
| 6,894,839 B2 | 5/2005 | Sugiyama et al. |
| 6,897,941 B2 | 5/2005 | Almogy |
| 6,951,996 B2 | 10/2005 | Timans et al. |
| 6,956,878 B1 | 10/2005 | Trisnadi |
| 6,961,184 B2 | 11/2005 | Yamazaki et al. |
| 6,987,240 B2 | 1/2006 | Jennings et al. |
| 7,005,601 B2 | 2/2006 | Jennings |
| 7,085,062 B2 | 8/2006 | Hauschild |
| 7,097,709 B2 | 8/2006 | Okamoto et al. |
| 7,098,155 B2 | 8/2006 | Talwar et al. |
| 7,105,048 B2 | 9/2006 | Yamazaki et al. |
| 7,135,392 B1 | 11/2006 | Adams et al. |
| 7,145,104 B2 | 12/2006 | Talwar et al. |
| 7,154,066 B2 | 12/2006 | Talwar et al. |
| 7,157,660 B2 | 1/2007 | Talwar et al. |
| 7,186,004 B2 | 3/2007 | Powell et al. |
| 7,221,444 B1 | 5/2007 | Zhao |
| 7,276,457 B2 | 10/2007 | Yoo |
| 7,724,785 B2 * | 5/2010 | Spinelli ................. H01S 3/117 372/10 |
| 8,193,468 B2 | 6/2012 | Cordingley et al. |
| 8,829,392 B2 * | 9/2014 | Adams ............... B23K 26/0604 219/121.75 |
| 2002/0067918 A1 | 6/2002 | Camm et al. |
| 2002/0111043 A1 | 8/2002 | Mahawili |
| 2003/0040130 A1 | 2/2003 | Mayur et al. |
| 2004/0120050 A1 | 6/2004 | Tsukihara et al. |
| 2006/0102607 A1 | 5/2006 | Adams et al. |
| 2006/0109443 A1 * | 5/2006 | Toyoda ................ G02B 3/0056 355/67 |
| 2006/0222041 A1 | 10/2006 | Moriwaka |
| 2006/0234458 A1 | 10/2006 | Jennings et al. |
| 2006/0289412 A1 | 12/2006 | Hamada |
| 2007/0032004 A1 | 2/2007 | Ramaswamy et al. |
| 2007/0114214 A1 | 5/2007 | Jennings et al. |
| 2009/0034071 A1 | 2/2009 | Jennings et al. |
| 2009/0034072 A1 | 2/2009 | Jennings et al. |

OTHER PUBLICATIONS

Liang, et al.; Applied Physics; Ultrashort Laser-Pulse Annealing of Hydrogenated Amorphous Silicon; dated 1981; 5 total pages.
Felch, et al.; Sub-Melt Laser Annealing Followed by Low-Temperature RTP for Minimized Diffusion; dated 2000; 4 total pages.
Brown, et al.; Multi-Aperture Beam Integration Systems dated 2000; 44 total pages.
Lin, et al.; Characterization of Excimer Lasers for Application to Lenslet Array Homogenizers; Applied Optics, vol. 40, No. 12; dated Apr. 20, 2001; 11 total pages.
Melles Griot; The Photonics Design and Applications Handbook; Beamsplitters: A Guide for Designers; dated 2002; 6 total pages.
Michael Pate; Fly's Eye Arrays for Uniform Illumination in Digital Projector Optics; dated Apr. 14, 2006; 7 total pages.

(56) References Cited

OTHER PUBLICATIONS

U.S. Appl. No. 11/831,830 entitled Method for Partitioning and Incoherently Summing a Coherent Beam in the name of Dean Jennings, et al., filed Jul. 31, 2007; 29 total pages.
U.S. Appl. No. 11/831,838 entitled Method and Apparatus for Decorrelation of Spatially and Temporally Coherent Light in the name of Dean Jennings, et al., filed Jul. 31, 2007; 20 total pages.
PCT Notification of Transmittal of the International Search Report and the Written Opinion of the International Searching Authority for International Application No. PCT/US 08/71761 dated Oct. 1, 2008; 11 total pages.
European Extended Search Report for Application No. 088273032 dated Oct. 14, 2016.

* cited by examiner

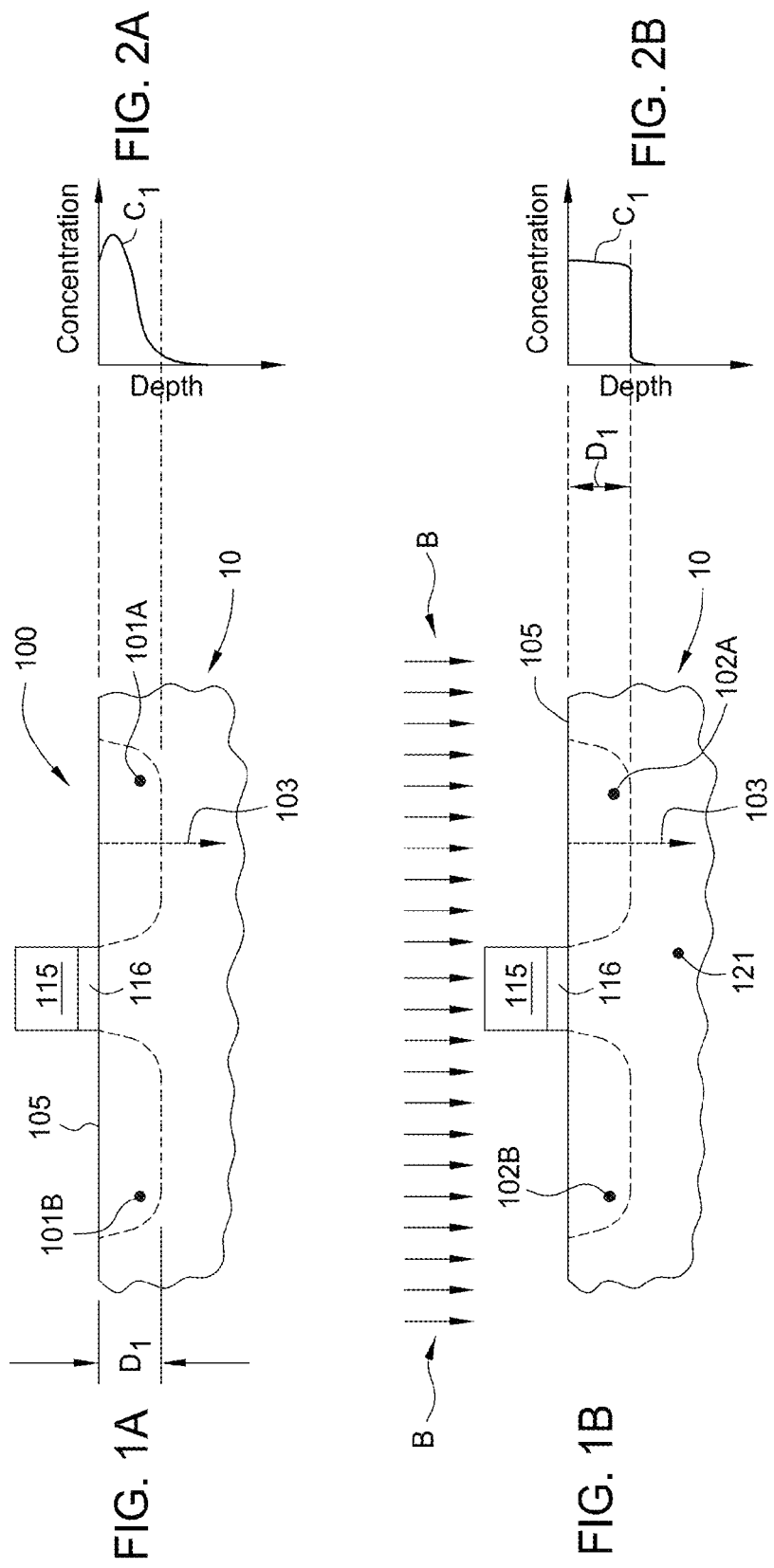

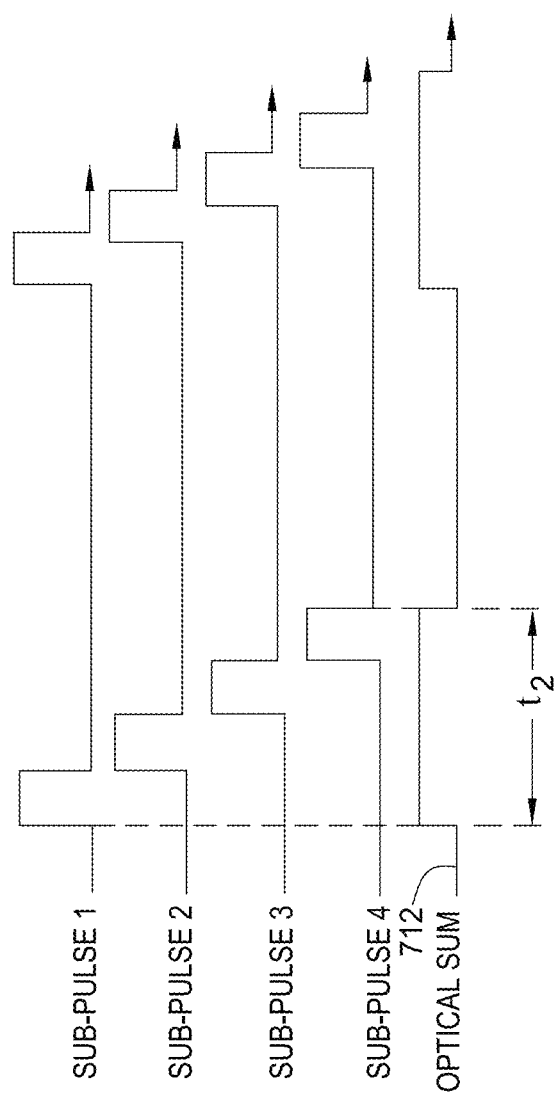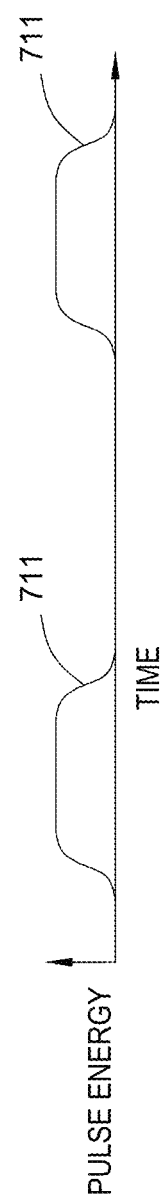

US 9,908,200 B2

APPARATUS AND METHOD OF IMPROVING BEAM SHAPING AND BEAM HOMOGENIZATION

CROSS-REFERENCE TO RELATED APPLICATIONS

This application is a continuation application of co-pending U.S. patent application Ser. No. 13/401,553 filed Feb. 21, 2012, which is a divisional of U.S. patent application Ser. No. 11/888,433, filed Jul. 31, 2007, which are all herein incorporated by reference. This application is also related to U.S. patent application Ser. No. 11/831,830, filed Jul. 31, 2007, and U.S. patent application Ser. No. 11/831, 838, filed Jul. 31, 2007.

BACKGROUND OF THE INVENTION

Field of the Invention

Embodiments of the present invention generally relate to an apparatus and method used to manufacture a semiconductor device. More particularly, the invention is directed to an apparatus and method that is used to thermally process a substrate.

Description of the Related Art

The integrated circuit (IC) market is continually demanding greater memory capacity, faster switching speeds, and smaller feature sizes. One of the major steps the industry has taken to address these demands is to change from batch processing silicon wafers in large furnaces to single wafer processing in a small chamber.

During such single wafer processing the wafer is typically heated to high temperatures so that various chemical and physical reactions can take place in multiple IC devices defined in the wafer. Of particular interest, favorable electrical performance of the IC devices requires implanted regions to be annealed. Annealing recreates a more crystalline structure from regions of the wafer that were previously made amorphous, and activates dopants by incorporating their atoms into the crystalline lattice of the substrate, or wafer. Thermal processes, such as annealing, require providing a relatively large amount of thermal energy to the wafer in a short amount of time, and thereafter rapidly cooling the wafer to terminate the thermal process. Examples of thermal processes currently in use include Rapid Thermal Processing (RTP) and impulse (spike) annealing. A drawback of RTP type processes is that it heats the entire wafer even though the IC devices reside only in the top few microns of the silicon wafer. This limits how fast one can heat up and cool down the wafer. Moreover, once the entire wafer is at an elevated temperature, heat can only dissipate into the surrounding space or structures. As a result, today's state of the art RTP systems struggle to achieve a 400° C./s ramp-up rate and a 150° C./s ramp-down rate. While RTP and spike annealing processes are widely used, current technology is not ideal, and tends to ramp the wafer temperature during thermal processing too slowly and thus expose the wafer to elevated temperatures for too long a period of time. These thermal budget type problems become more severe with increasing wafer sizes, increasing switching speeds, and/or decreasing feature sizes.

To resolve some of the problems raised in conventional RTP type processes various scanning laser anneal techniques have been used to anneal the surface(s) of the substrate. In general, these techniques deliver a constant energy flux to a small region on the surface of the substrate while the substrate is translated, or scanned, relative to the energy delivered to the small region. Due to the stringent uniformity requirements and the complexity of minimizing the overlap of scanned regions across the substrate surface these types of processes are not effective for thermal processing contact level devices formed on the surface of the substrate.

Pulsed laser anneal techniques have been used to anneal finite regions on the surface of the substrate to provide a well defined annealed and/or re-melted regions on the surface of the substrate. In general, a during a pulse laser anneal processes various regions on the surface of the substrate are exposed to a desired amount of energy delivered from the laser to cause the preferential heating of desired regions of the substrate. Pulse laser anneal techniques have an advantage over conventional processes that sweep the laser energy across the surface of the substrate, since the need to tightly control the overlap between adjacently scanned regions to assure uniform annealing across the desired regions of the substrate is not an issue, since the overlap of the exposed regions of the substrate is typically limited to the unused space between die, or "kurf" lines (e.g., lines 10A in FIG. 3).

Due to the shrinking semiconductor device sizes and stringent device processing characteristics the tolerance in the variation in the amount of energy delivered during each pulse to different devices formed on the substrate surface is very low. These device requirements have made the tolerance to variations in the delivered energy across the exposed surface of the substrate to be rather small (i.e., <5% variation). One common non-uniformity phenomena is called "speckle." Speckle is the generation of a random intensity distribution, or "hot spots" on the surface of the substrate, when light from a highly coherent source, such as a laser, is scattered by the features formed on a rough surface or inhomogeneous medium. Therefore, there is a need for a pulse laser technique that has a desirable uniformity and reduces or minimizes the effects of speckle on the laser annealed regions of the substrate.

To better control the pulsed laser anneal process and minimize the lateral inter-diffusion between devices the energy delivered in each pulse needs to be relatively high and the pulse duration needs to be short, but not short enough to damage the material exposed to the pulse of energy. Rapid heating of the exposed material can cause regions of high stress in the substrate, cracks to form in the substrate, or even ejection of material from the substrate surface due to the rapid expansion of the melted regions of the substrate. Therefore, there is need for a pulse laser anneal system that is able to reliably deliver energy to the surface of the substrate with minimal damage to the structure of the substrate material.

Also, the required high energy delivered during each laser pulse can permanently damage or greatly reduce the useable lifetime of the optical components (e.g., lenses) used to deliver and control the amount of energy to the surface of the substrate. Therefore, there is need for apparatus and method that can be used to deliver a high energy laser pulse that will not damage or greatly affect the useable lifetime of the optical components used to deliver the energy to the substrate surface.

SUMMARY OF THE INVENTION

The present invention generally provide an apparatus of thermally processing a substrate, comprising an energy source that has an output and is adapted to deliver a first energy pulse, a first micro-lens array having a plurality of micro-lenses that are adapted to receive at least a portion of the first energy pulse transmitted from the output of the energy source, a second micro-lens array having a plurality of micro-lenses that are adapted to receive the at least a portion of the energy transmitted from the first micro-lens array, a first lens that is positioned to receive the at least a portion of the energy transmitted from the micro lenses in the second micro-lens array and transmit the energy received from the second micro-lens array, and a second lens that is positioned to receive the at least a portion of the first energy pulse and cause the image received by two or more micro-lenses in the first micro-lens array to be at least partially different, wherein the second lens is adapted to improve the uniformity of the at least a portion of the first pulse transmitted by the first lens.

Embodiments of the invention further provide an apparatus of thermally processing a substrate, comprising an energy source that has an output that is adapted to deliver a first energy pulse, a pulse stretching device that comprises a first beam splitting device that is adapted to split the first energy pulse delivered from the energy source into a first sub-pulse and a second sub-pulse, wherein the first sub-pulse is transferred along a first path having a first length to a beam combining device, and a first plurality of mirrors that are aligned to reflect the second sub-pulse received from the first beam splitting device along a second path having a second length to the beam combining device, wherein the beam combining device is adapted to transmit the first sub-pulse and second sub-pulse to one or more components that are used to direct them to a surface of a substrate, a first micro-lens array having a plurality of micro-lenses that are adapted to receive at least a portion of the first energy pulse, a second micro-lens array having a plurality of micro-lenses that are adapted to receive the at least a portion of the energy transmitted from the first micro-lens array, a first lens that is positioned to receive the at least a portion of the energy transmitted from the micro lenses in the second micro-lens array and transmit the energy received from the second micro-lens array to one or more components that are used to direct the energy received to the surface of the substrate, and a random diffuser that is positioned to receive at least a portion of the first energy pulse and transmit the at least a portion of the first energy pulse to the first micro-lens array.

Embodiments of the invention further provide an apparatus of thermally processing a substrate, comprising a first energy source that has an output that is adapted to deliver a first energy pulse, a second energy source that has an output that is adapted to deliver a second energy pulse, a pulse stretching device that comprises a first beam splitting device that is adapted to split the first pulse delivered from the energy source into a first sub-pulse and a second sub-pulse, and the second energy pulse delivered from the energy source into a third sub-pulse and a fourth sub-pulse, wherein the first sub-pulse and the third sub-pulse are transferred along a first path having a first length to a beam combining device, and a first plurality of mirrors that are aligned to reflect the second sub-pulse and the fourth sub-pulse received from the first beam splitting device along a second path having a second length to the beam combining device, a first micro-lens array having a plurality of micro-lenses that are adapted to receive at least a portion of the first energy pulse and a portion of the second energy pulse, a second micro-lens array having a plurality of micro-lenses that are adapted to receive the at least a portion of the energy transmitted from the first micro-lens array, a first lens that is positioned to receive the at least a portion of the energy transmitted from the micro lenses in the second micro-lens array and transmit the energy received from the second micro-lens array, a random diffuser that is positioned to receive at least a portion of the first energy pulse and a portion of the second energy pulse and transmit the at least a portion of the first energy pulse and a portion of the second energy pulse to the first micro-lens array, wherein the random diffuser is adapted to receive at least a portion of the first sub-pulse, the second sub-pulse, the third sub-pulse, and the fourth sub-pulse delivered from the beam combining device, and a controller that is adapted to synchronize the delivery of the first energy pulse and the second energy pulse, wherein a composite pulse formed by summing the first energy pulse and the second energy pulse over time has a pulse width that is greater than the pulse width of the first energy pulse and the second energy pulse.

Embodiments of the invention further provide a method of thermally processing a substrate, comprising positioning a substrate on a substrate support, delivering a first energy pulse having a first wavelength and first pulse width to a first lens from a first energy source, transmitting at least a portion of the first energy pulse to a first micro-lens array from the first lens so that the uniformity of the image received by two or more micro-lens is at least partially different, transmitting at least a portion of the energy received by the first micro-lens array to a second micro-lens array, wherein the first micro-lens array is adapted to increase the energy density of the portion of the energy received by the second lens array, and transmitting at least a portion of the energy received by the second micro-lens array to a second lens, wherein the second lens is adapted to transmit the received energy to components that transfer the energy to a region on the surface of the substrate positioned on the substrate support.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1B illustrate a schematic side view of a region on a surface of a substrate described within an embodiment herein;

FIG. 2A illustrate a graph of concentration versus depth into a region of a substrate illustrated in FIG. 1A that is within an embodiment herein;

FIG. 2B illustrate a graph of concentration versus depth into a region of a substrate illustrated in FIG. 1B that is within an embodiment herein;

FIG. 7B illustrate graph of sub-pulses generated in a laser anneal system illustrated in FIG. 7A according to an embodiment described herein;

FIG. 7C illustrates the effect of delivering the pulses illustrated in FIG. 7B on a surface of the substrate described within an embodiment contained herein;

DETAILED DESCRIPTION

Figure 3:
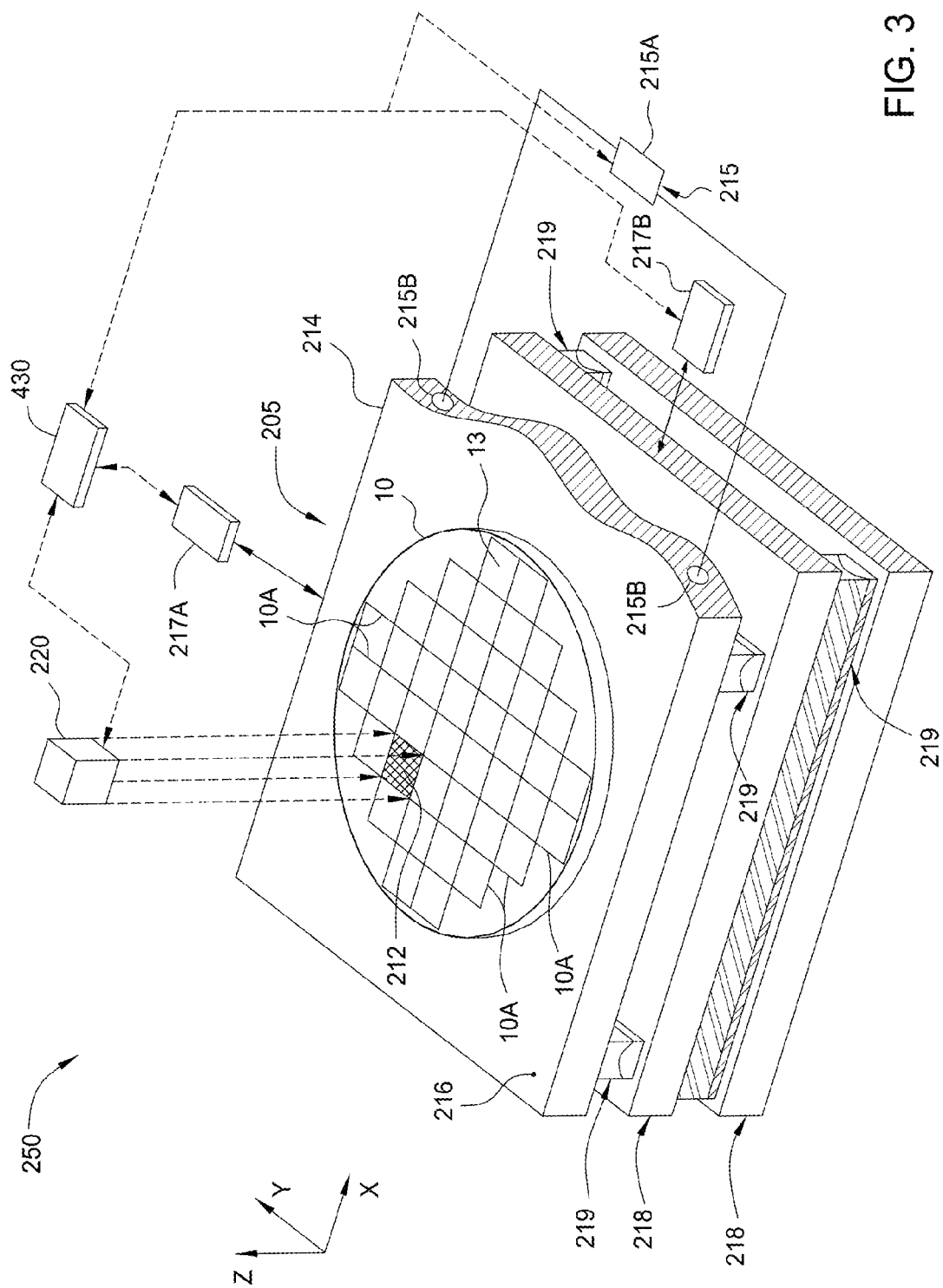
FIG. 3 illustrates a schematic isometric view of an energy source that is adapted to project an amount of energy on a defined region of the substrate described within an embodiment herein.

The present invention generally relates to an optical system that is able to reliably deliver a uniform amount of energy across an anneal region 212 (FIG. 3) contained on a surface of a substrate. In one embodiment, the optical system is adapted to deliver, or project a uniform amount of energy, or "image," having a desired two-dimensional shape to a desired region on the surface of the substrate. Typically, the anneal regions 212 may be square or rectangular in shape and range in area between about 4 mm$^2$ and about 1000 mm$^2$. Generally, the optical system and methods of the present invention are used to preferentially anneal one or more regions found within the anneal regions 212 by delivering enough energy to cause the one or more regions to re-melt and solidify.

In general the term "substrates" as used herein can be formed from any material that can benefit from the pulse laser annealing process, such as a material that has some natural electrical conducting ability or a material that can be modified to provide the ability to conduct electricity. Typical substrate materials include, but are not limited to semiconductors, such as silicon (Si), $Si_xGe_{1-x}$ alloys, and germanium (Ge), as well as other compounds that exhibit semiconducting properties. Such semiconductor compounds generally include group III-V and group II-VI compounds. Representative group III-V semiconductor compounds include, but are not limited to, gallium arsenide (GaAs), gallium phosphide (GaP), and gallium nitride (GaN). Generally, the term semiconductor substrates include bulk semiconductor substrates as well as substrates having deposited layers disposed thereon. Similarly, the invented methods can also be applied to form integrated devices, such as thin-film transistors (TFTs), on relatively thin crystalline silicon layers formed on insulating substrates (e.g., silicon-on-insulator [SOI] substrates).

In general, pulse laser anneal type processes are used to minimize inter-diffusion between various regions of a formed device, remove defects in the substrate material, and more evenly distribute dopants in various regions of the substrate after performing an implant step. The laser anneal process generally contains one or more processing steps that are performed on various regions of the substrate to cause them to preferentially melt when exposed to the energy delivered from an energy source (e.g., optical system 220 in FIGS. 3 and 4A-B). In one example, the substrate properties within the anneal region(s) 212 (see FIG. 2) can be modified to allow preferential melting to create the melting point contrast in desired regions of the substrate. Examples of various techniques that may be used to create a melting point contrast are further described in the co-pending U.S. patent application Ser. No. 11/459,847, filed Jul. 25, 2006, which is herein incorporated by reference.

FIGS. 1A-1B illustrate cross-sectional views of an electronic device 100 at different stages of a device fabrication sequence, which are intended to illustrate one example of some of the pulse laser anneal process steps. FIG. 1A illustrates a side view of typical electronic device 100 formed on a surface 105 of a substrate 10 that has two doped regions 101 (e.g., doped regions 101A-101B), such as a source and drain region of a MOS device, a gate 115, and a gate oxide layer 116. The doped regions 101A-101B are generally formed by implanting a desired dopant material into the surface 105 of the substrate 10. In general, typical n-type dopants (donor type species) may include arsenic (As), phosphorus (P), and antimony (Sb), and typical p-type dopants (acceptor type species) may include boron (B), aluminum (Al), and indium (In) that are introduced into the substrate 10 to form the doped regions 101A-101B. FIG. 2A illustrates an example of the concentration of the dopant material as a function of depth (e.g., curve $C_1$), from the surface 105 and into the substrate 10 along a path 103 extending through the doped region 101A after an implant process has been performed on the substrate 10. The doped region 101A has a junction depth $D_1$ after the implant process, which may be defined as a point where the dopant concentration drops off to a negligible amount. It should be noted that FIGS. 1A-1B are only intended to illustrate some of the various aspects of the invention and is not intended to be limiting as to the type of device, type of structure, or regions of a device that may benefit from the various aspects of the invention described herein. As semiconductor device sizes decrease the position and geometry of structural elements of the electronic devices 100 formed on the surface 105 of a substrate 10 may vary to improve device manufacturability or device performance.

FIG. 1B illustrates a side view of the electronic device 100 shown in FIG. 1A that is exposed to radiation "B" emitted from the an energy source, such as optical radiation from a laser. During this step desired area(s) of the substrate 10 are exposed to an amount of energy which causes the various regions of the substrate (e.g., doped regions 101A-101B) to selectively melt and resolidify after the pulse of radiation "B" has been applied. The amount of energy, the energy density and the duration that the radiation "B" is applied can be set to preferentially melt the regions 101A and 101B to form the annealed regions 102A and 102B by knowing the desired depth of these regions, the materials contained within these regions, the adjacent materials used to form the electronic device 100, and the heat transfer characteristics of the components within the formed electronic device 100. As shown in FIGS. 1B and 2B, upon exposure to the radiation "B" the remelting and solidification of the annealed regions 102A-102B causes the concentration of the dopant atoms (e.g., curve $C_1$) to more uniformly redistributed across the region 102. Also, the dopant concentration between the regions 102A-B and the substrate bulk material 121 has a sharply defined boundary (i.e., a "hyper-abrupt" junction) and thus minimizes the unwanted diffusion into the substrate bulk material 121. In the example, discussed above, any damage is induced into the substrate 10 during the implant or other subsequent processes will preferably drop to a negligible level.

Figure 11A:
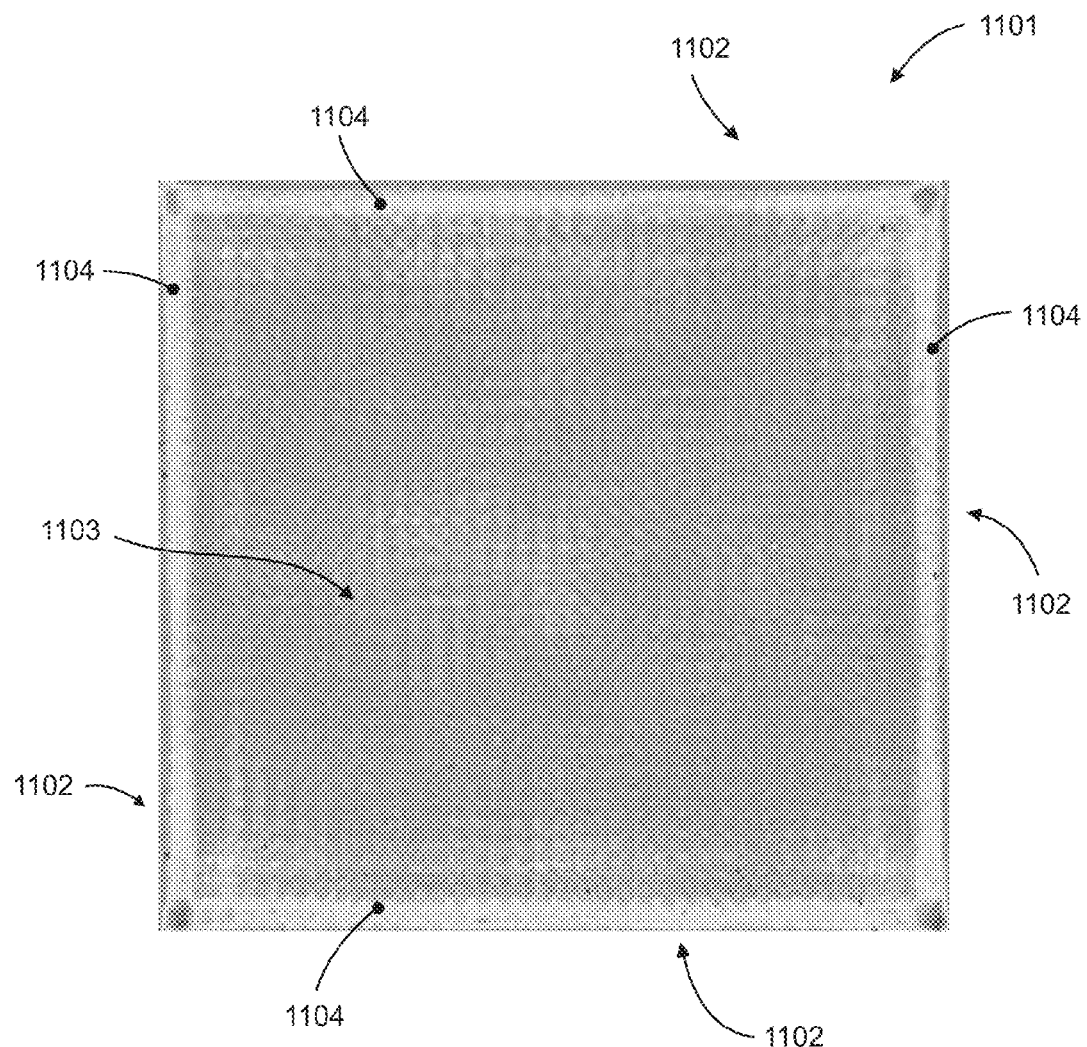
FIG. 11A illustrates an non-uniform image described within an embodiment herein.
Figure 11B:
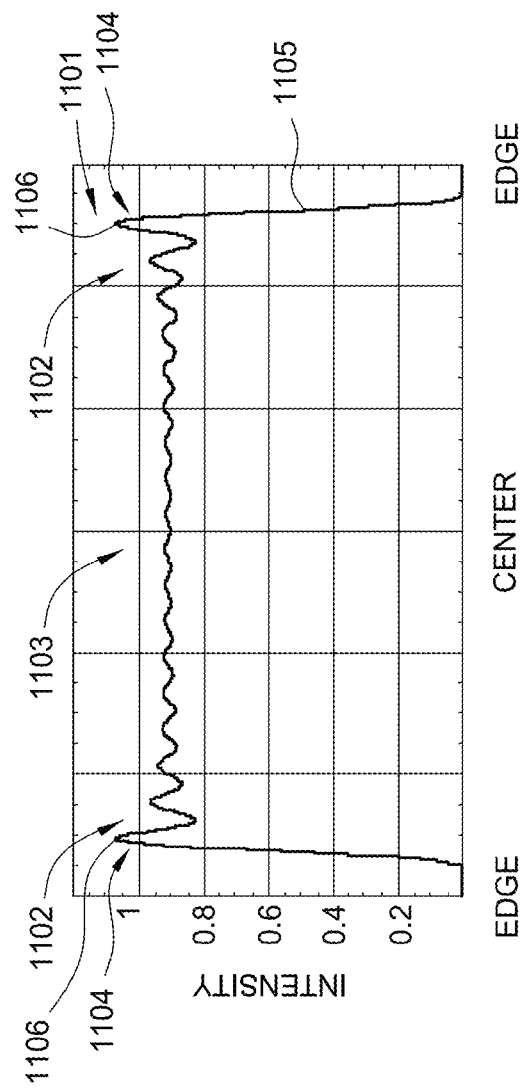
FIG. 11B illustrates a graph of the intensity versus distance across the non-uniform image illustrated in FIG. 11A described within an embodiment herein.

FIG. 3 illustrates a schematic representation of a portion of the laser anneal system 250, which contains an optical system 220 that is adapted to project an amount of energy on an anneal region 212 found on a surface of a substrate that is positioned on a substrate support assembly 205. For example, there are 40 anneal regions 212 illustrated in FIG. 3. In general, during a pulse laser anneal processes each of the anneal regions 212 formed on the surface of the substrate 10 are sequentially exposed to a desired amount of energy delivered from the optical system 220 to cause the preferential annealing and/or melting within the anneal regions 212 of the substrate. The anneal regions 212 may cover an area of between about 4 mm$^2$ (e.g., 2 mm×2 mm) and about 1000 mm$^2$ (e.g., 25 mm×40 mm). It should be noted that the shape of the edges of the anneal regions 212 could be any shape without varying from the scope of the invention as described herein. In general, it is desirable to deliver a pulse of energy that has a uniform energy density per unit time (e.g., watts/mm$^2$-sec) across the anneal region 212 so that the annealing process on all parts of the anneal region 212 are uniform. For example, it desirable to deliver a pulse of energy that has a uniformity across the anneal region 212 that is less than about 5%, where uniformity is measured by dividing the standard deviation by the mean value. The 2-D representation of the uniform pulse of energy that is to be projected across the anneal region 212 is often called the "image" (see FIGS. 11A-11F), which ideally has a uniform energy density (FIG. 11D).

Referring to FIG. 3, in general, the areas on the surface of the substrate may be sequentially exposed by translating the substrate 10 positioned on the substrate support assembly 205 relative to the output of the electromagnetic radiation source (e.g., conventional X/Y stage, precision stages) and/or translating the output of the radiation source (e.g., a portion of the optical system 220) relative to the substrate. The substrate supporting components in the substrate support assembly 205 are adapted to support, position, and in some cases heat the substrate 10. In one embodiment, a substrate support assembly 205 contains one or more electrical actuators 217A, 217B (e.g., linear motor, lead screw and servo motor) and one or more precision stages 218, which are used to control the movement and position of substrate 10. The precision stages may contain one or more linear slides 219 that are used to guide and support the various substrate supporting components. In one embodiment, the movement of a substrate support 214 in a y-direction is controlled by use of an electrical actuator 217A and the movement of a substrate support 214 in an x-direction is controlled by use of an electrical actuator 217B.

Further, it may be desirable to control the temperature of the substrate during thermal processing by placing a surface of the substrate 10 in thermal contact with a substrate supporting surface 216 of the substrate support 214 and a heat exchanging device 215. The heat exchanging device 215 is generally adapted to heat and/or cool the substrate support 214 and substrate prior to, during, or after the annealing process. In this configuration, the heat exchanging device 215, such as a conventional substrate heater available from Applied Materials Inc., Santa Clara, Calif. (e.g., electrically resistive heating elements, temperature controlled fluid heat exchanger), and may be used to improve the post-processing properties of the annealing regions 212 of the substrate. In one embodiment, the laser anneal system 250 contains a power supply 215A and resistive heating elements 215B that are in thermal contact with the substrate supporting surface 216 and are used to pre-heat the substrate positioned thereon to a temperature between about 20° C. and about 800° C. prior to performing the pulse laser anneal process. In another embodiment, the power supply and resistive heating elements are adapted to pre-heat the substrate positioned on the substrate support to a temperature between about 100° C. and about 500° C. In yet another embodiment, the power supply and resistive heating elements are adapted to pre-heat the substrate positioned on the substrate support to a temperature between about 200° C. and about 450° C. In yet another embodiment, the power supply and resistive heating elements are adapted to pre-heat the substrate positioned on the substrate support to a temperature between about 400° C. and about 450° C. In another embodiment, it may be desirable to cool the substrate to a temperature between about −240° C. and about 20° C. prior to performing the annealing process by use of conventional chiller type heat exchanging device (e.g., cryogenic cooling system).

Figure 4:
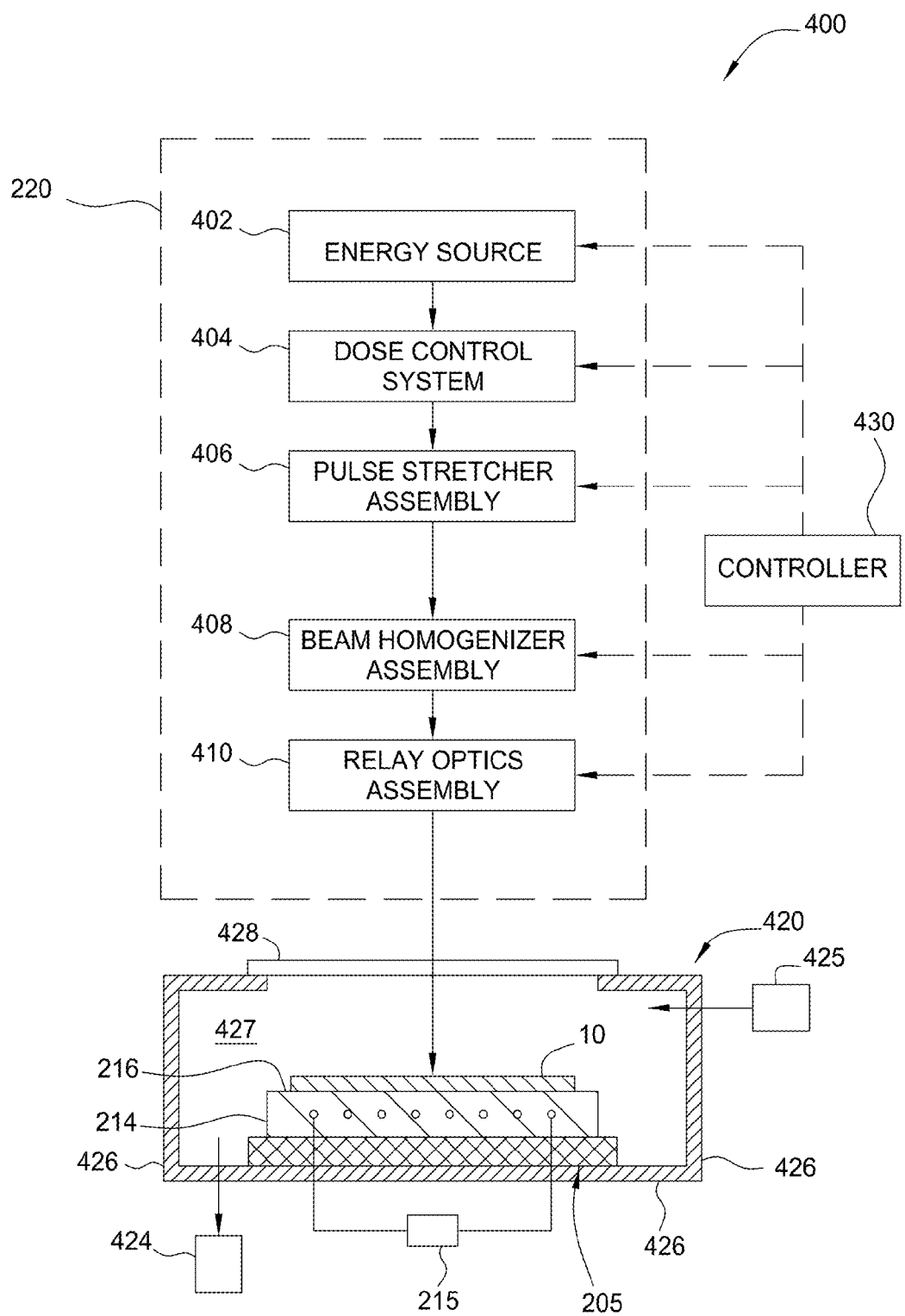
FIG. 4 illustrates a schematic view of a laser anneal system according to an embodiment described herein.

FIG. 4 schematically illustrates a laser anneal system 400 that contains an optical system 220, a laser anneal processing chamber 420, and a system controller 430. The system controller 430 is generally adapted to control the various components contained within the optical system 220 and the laser anneal processing chamber 420, which are discussed herein. The system controller 430 is generally designed to facilitate the control and automation of the thermal processing techniques described herein and typically may include a central processing unit (CPU) (not shown), memory (not shown), and support circuits (or I/O) (not shown). The CPU may be one of any form of computer processors that are used in industrial settings for controlling various processes and hardware (e.g., conventional electromagnetic radiation detectors, motors, laser hardware) and monitor the processes (e.g., substrate temperature, substrate support temperature, amount of energy from the pulsed laser, detector signal). The memory (not shown) is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like. A program (or computer instructions) readable by the controller determines which tasks are performable on a substrate. Preferably, the program is software readable by the controller and includes code to monitor and control the substrate supports position relative to the output of the laser, the amount of energy delivered in each electromagnetic pulse, the timing of one or more electromagnetic pulses, the intensity as a function of time for each pulse, the temperature of the substrate, the wavelength of each pulse delivered from each electromagnetic source to the substrate, and any combination thereof.

The laser anneal processing chamber 420 may contain an enclosed processing region 427 that has one or more chamber walls 426 and an optically transparent window 428. The laser anneal processing chamber 420 may also contain the substrate support 214 discussed above. During processing, the processing region 427 may be evacuated by use of vacuum pump 424 and/or purged using an inert gas source 425 to reduce the partial pressure of undesirable gases, such as oxygen.

Optical System

FIG. 4 also schematically illustrates one embodiment of the optical system 220, which include an energy source 402, a dose control system 404, a pulse stretcher assembly 406, a beam homogenizer assembly 408, and a relay optics assembly 410. As noted above, the optical system 220 is adapted to repeatedly deliver a desired uniform dose of energy across the anneal regions 212 to preferentially anneal and/or melt desired areas within these regions. The system controller 430 and components within the optical system 220 are used to control the timing, the duration, the profile of the pulse (e.g., energy versus time), and amount of energy delivered in each pulse to the anneal region 212. The system controller 430 is also generally adapted to control the various laser anneal processing chamber 420 and other system components discussed above.

The amount of energy required to perform the laser anneal process on a semiconductor substrate described herein can be quite large. For example, the dose of energy delivered from the energy source 402 may be between about 1 and about 10 Joules over an 8 to 10 nanosecond (ns) pulse duration, which is equivalent to delivering an average total power of between about 100 MW to about 1,250 MW in each pulse to the anneal region. If the anneal regions 212 have an area of between about 4 mm$^2$ and about 1000 mm$^2$ the average energy density will be between about 0.1 MW/mm$^2$ and about 313 MW/mm$^2$. It should be noted that the instantaneous power delivered at any time during each pulse may be much higher or lower than the average due to variations in the profile of the energy pulse. It has been found that the high powers required to perform the pulse laser anneal process can cause the usable lifetime of the optical components used to deliver or direct the energy to the surface of the substrate to be significantly reduced due to damage. This induced damage can cause the process uniformity to vary pulse-to-pulse and increase the cost-of-ownership of the system.

Energy Source Assembly

The energy source 402 is generally adapted to deliver electromagnetic energy that is used to perform the pulse laser anneal process. Typical sources of electromagnetic energy include, but are not limited to an optical radiation source, an electron beam source, and/or a microwave energy source. In one embodiment of the invention, the energy source 402, such as a laser, is adapted to deliver optical radiation to selectively heat desired regions of a substrate to their melting point. Since the effectiveness of the laser anneal process is dependent on the transmission, absorption and reflection of the energy delivered from the energy source 402 by the material to be annealed, the wavelength ($\lambda$) or wavelengths, of the delivered energy may be tuned so that they deliver a desired amount of energy to a desired depth within the substrate. It should be noted that the amount of energy delivered by each photon of light also varies as a function of wavelength ($E=hc/\lambda$), and thus the shorter the wavelength the greater the energy delivered by each photon of light. However, in some cases the substrate material, such as silicon, has an absorption edge that varies with thickness and wavelength, which limit the wavelengths that are absorbed by the substrate material. Therefore, depending on the thickness and type of material from which the substrate is made, the wavelength(s) of the emitted radiation may be varied to achieve the desired energy transfer to the substrate to minimize damage and promote uniform heating of the exposed region of the substrate. In one embodiment, the energy source 402 is adapted to deliver energy at a wavelength less than about 1064 nm to a primarily silicon containing substrate. In one embodiment, the laser annealing processes is performed on a silicon containing substrate using radiation that is delivered at wavelengths that are less than about 800 nm. In another embodiment, the wavelength of the electromagnetic energy delivered from the energy source is about 532 nm to the primarily silicon containing substrate. In yet another embodiment, the wavelength of the electromagnetic energy delivered from the energy source is about 216 nm or about 193 nm to the primarily silicon containing substrate. In one aspect of the invention it is desirable to use an Nd:YAG (neodymium-doped yttrium aluminium garnet) laser that is adapted to deliver energy at a wavelength between about 266 nm and about 1064 nm.

Generally, current commercial lasers are not able to deliver energies near the high end of the desired pulse laser anneal energy level (e.g., >2 Joules) and thus in one embodiment the outputs of multiple lasers are combined to deliver a desired amount of energy to the surface of the substrate. However, damage to the substrate can occur if the characteristics of the energy pulse used in the annealing process is not optimized or controlled. Typically, energy pulse characteristics may include but are not limited to the total amount of energy, the energy flux, the energy density, and/or the duration of the pulse. If the energy pulse characteristics are not optimized, damage to the substrate is generally created by the stress induced due to the rapid heating of the melted regions on the surface of the substrate. The rapid heating can generate acoustic shock waves in the substrate that can cause cracks, induce stress, and otherwise damage various regions of the substrate. It should be noted that energy pulse durations that are too long are also undesirable since this may cause the dopants in the anneal regions 212 to undesirably diffuse into adjacent regions of the substrate. Since current commercial lasers are generally not able to deliver pulses that have a desired duration (i.e., pulse width), a system that can deliver energy to the surface of the substrate that has desirable pulse characteristics is needed.

In one embodiment, the energy source 402 is adapted to deliver energy between about 1 and 10 joules at a pulse width between about 6 ns and about 80 ns at a desired wavelength, such as 532 nm. In another embodiment, the energy source 402 is adapted to deliver energy between about 1 and 10 joules at a pulse width between about 20 ns and about 30 ns at a desired wavelength, such as 532 nm. In another embodiment, the energy source 402 is adapted to deliver energy between about 1 and 10 joules at a pulse width between about 8 ns and about 80 ns at wavelengths such as 748 nm and/or 1064 nm.

Dose Control System

In one embodiment of the invention, a dose control system 404 is placed between the energy source 402 and the processing chamber 420 to control the timing and amount of energy delivered to the surface of the substrate 10 during the laser annealing process. Generally, to improve the reliability and the repeatability of the energy delivered from a pulsed laser type of energy sources 402, the output of the pulsed laser source is continually pulsed at a desired frequency and only a fraction of the delivered pulses are allowed to pass through the dose control system 404 and make their way to the surface of the substrate. The dose control system 404 can thus control the delivery of a pulse of energy at a desired time to the other components in the optical system 220.

Figure 5:
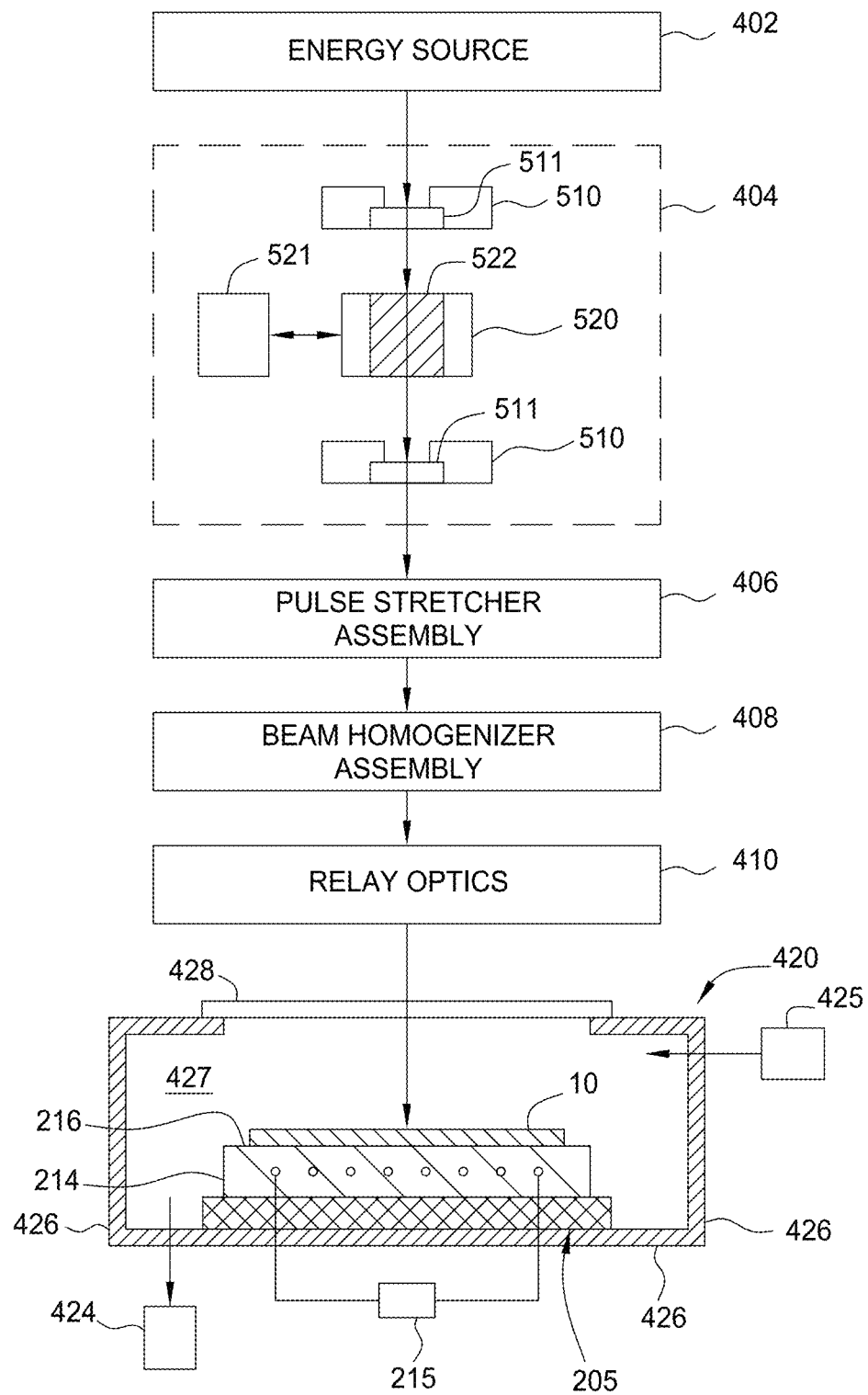
FIG. 5 illustrates a schematic view of a dose control system that is positioned within a laser anneal system according to an embodiment described herein.

In one embodiment, as illustrated in FIG. 5 the dose control system 404 contains at least one shutter assembly 510 (e.g., two shown in FIG. 5) and an attenuator assembly 520. In general, each shutter assembly 510 contains an aperture 511 that is controlled to block or allow the energy delivered from the energy source 402 to the other components in the optical system 220. In one embodiment, as shown in FIG. 5 the dose control system contains two shutter assemblies 510 that are used in concert with each other to more safely and accurately control which pulses are allowed to pass through the dose control system 404. The shutter assemblies 510 may be water cooled or have a provision to reflect the delivered energy to an external energy collector (not shown), or "beam dump," to assure that the energy delivered by the energy source 402 doesn't overheat and cause damage to the shutter assembly components.

The dose control system 404 may also contain an attenuator assembly 520 that is used to adjust the amount of energy in each pulse that exits the dose control system 404. In configurations where the energy source 402 delivers partially polarized light the attenuator assembly 520 may contain a wave plate 522 that can be rotated, or oriented, by use of an actuator 521 to preferentially alter the polarization angle of a light wave traveling through it so that it can be partially blocked by other components (e.g., polarizing cubes) in the optical system 220, and thus allows the combination of components to control the amount energy delivered to the substrate surface. In one embodiment, a Pockels Cell or other similar device, is used in place of a wave plate 522 in the attenuator assembly 520 to control the amount of transmitted energy through the dose control system 404.

Pulse Stretcher Assembly

Figure 6A:
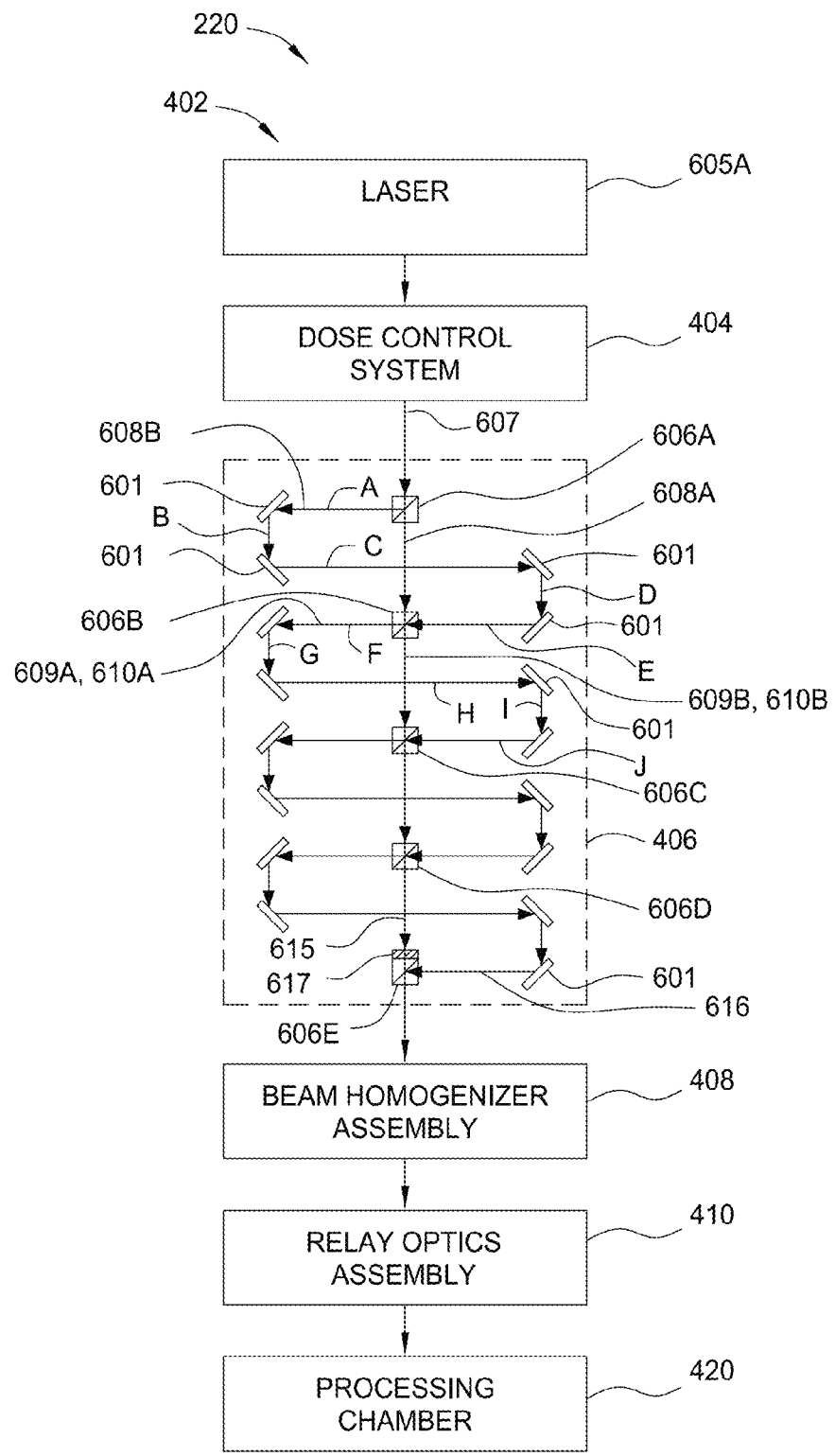
FIG. 6A illustrates a schematic view of a pulse stretcher assembly that is positioned within a laser anneal system according to an embodiment described herein.

FIG. 6A schematically illustrates one embodiment of a pulse stretcher assembly 406 that is used to optimize the profile, or shape, of the delivered energy as a function of time that is delivered to the surface of the substrate during the pulse laser annealing process. As noted above, most conventional lasers are not able to deliver a pulse that has a desirable profile, and thus each of the pulses delivered from the optical system 220 to the substrate needs to be adjusted to prevent damage to the substrate and/or optimize the pulse laser anneal process results. Examples of various pulse profiles that can be delivered to a substrate are illustrated in the energy as a function of time graphs (i.e., pulse energy profiles 611, 711 and 811) shown in FIGS. 6C, 7C, and 8C.

As shown in FIG. 6A, the pulse stretcher assembly 406 may comprise a plurality of mirrors 601 (e.g., 16 mirrors are shown) and a plurality of beam splitters (e.g., reference numerals 606A-606E) that are used to delay portions of the transmitted pulse 607 delivered from the energy source 402 to provide a composite pulse that has a desirable pulse characteristics (e.g., pulse width and pulse profile). In one example, a spatially coherent pulse of light is delivered from a single laser source 605A found in the energy source 402. In one embodiment, a pulse 607, which is transferred from the laser source 605A and passes through the dose control system 404, is split into two components, or sub-pulses 608A, 608B, after passing through the first beam splitter 606A. Neglecting losses in the various optical components, depending on the transmission to reflection ratio in the first beam splitter 606A, a percentage of the energy transferred in the pulse 607 (i.e., X %) is transferred to the second beam splitter 606B in the first sub-pulse 608A, and a percentage of the energy (i.e., 1–X %) of the second sub-pulse 608B follows a path A-E (i.e., segments A-E) as it is reflected by multiple mirrors 601 before it strikes the second beam splitter 606B. In one example, the transmission to reflection ratio of the first beam splitter 606A is selected so that 70% of the pulse's energy is reflected and 30% is transmitted through the beam splitter. In another example the transmission to reflection ratio of the first beam splitter 606A is selected so that 50% of the pulse's energy is reflected and 50% is transmitted through the beam splitter. Referring to FIG. 6A, the length of the path A-E, or sum of the lengths of the segments A-E (i.e., total length=A+B+C+D+E as illustrated in FIG. 6A), will control the delay between sub-pulse 608A and sub-pulse 608B. In general by adjusting the difference in path length between the first sub-pulse 608A and the second sub-pulse 608B a delay of about 1.02 nanoseconds (ns) per foot can be realized.

Figure 8A:
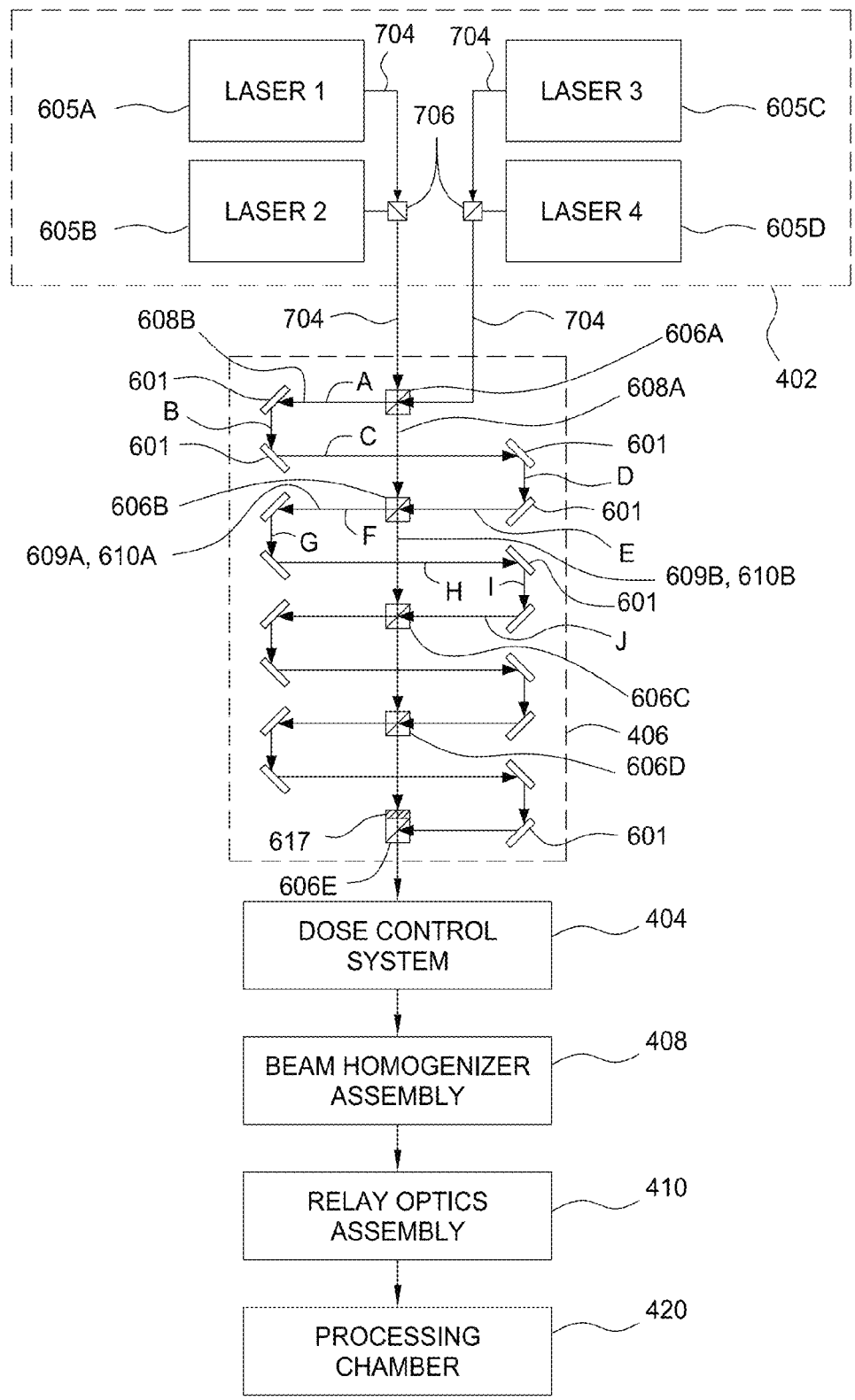
FIG. 8A illustrates a schematic view of a novel version of an energy source and a pulse stretcher assembly that is positioned within a laser anneal system according to an embodiment described herein.

Next, the energy delivered to the second beam splitter 606B in the first sub-pulse 608A is split into a second sub-pulse 609A that is directly transmitted to the third beam splitter 606C and a second sub-pulse 609B that follows the path F-J before it strikes the third beam splitter 606C. The energy delivered in the second sub-pulse 608B is also split into a third sub-pulse 610A that is directly transmitted to the third beam splitter 606C and a third sub-pulse 610B that follows the path F-J before it strikes the third beam splitter 606C. This process of splitting and delaying each of the sub-pulses continues as each of the sub-pulses strike subsequent beam splitters (i.e., reference numerals 606D-E) and mirrors 601 until they are all recombined in the final beam splitter 606E that is adapted to primarily deliver energy to the next component in the optical system 220. The final beam splitter 606E may be a polarizing beam splitter that adjusts the polarization of the energy in the sub-pulses received from the delaying regions or from the prior beam splitter so that it can be directed in a desired direction. In one embodiment, a waveplate 617 is positioned before a polarizing type of final beam splitter 606E so that its polarization can be rotated for the sub-pulses following path 615. Without the adjustment to the polarization, a portion of the light will be reflected by the final beam splitter and not get recombined with the other branch. In one example, all light in the pulse stretcher assembly 406 is S-polarized, and thus the non-polarizing cube beam splitters divide incoming beams, but the final beam splitter, which is a polarizing cube, combines the energy that it receives. The energy in the sub-pulses following path 615 will have its polarization rotated to P, which passes straight through the polarizing beam splitter, while the other sub pulses following path 616 are S-polarized and thus are reflected to form a combined beam. In one embodiment, the final beam splitter 606E comprises a non-polarizing beam splitter and a mirror that is positioned to combine the energy received from the delaying regions or from the prior beam splitter. In this case, the beam splitter will project part of the energy towards a desired point, transmit another part of the energy received towards the desired point, and the mirror will direct the remaining amount of energy transmitted through the beam splitter to the same desired point. One will note that the number of times the pulse is split and delayed may be varied by adding beam splitting type components and mirrors in the configuration as shown herein to achieve a desirable pulse duration and a desirable pulse profile. While FIGS. 6A and 8A illustrate a pulse stretching design that utilizes four beam delaying regions, which contain a beam splitter and mirrors, this configuration is not intended to be limiting as to the scope of the invention.

Figure 6B:
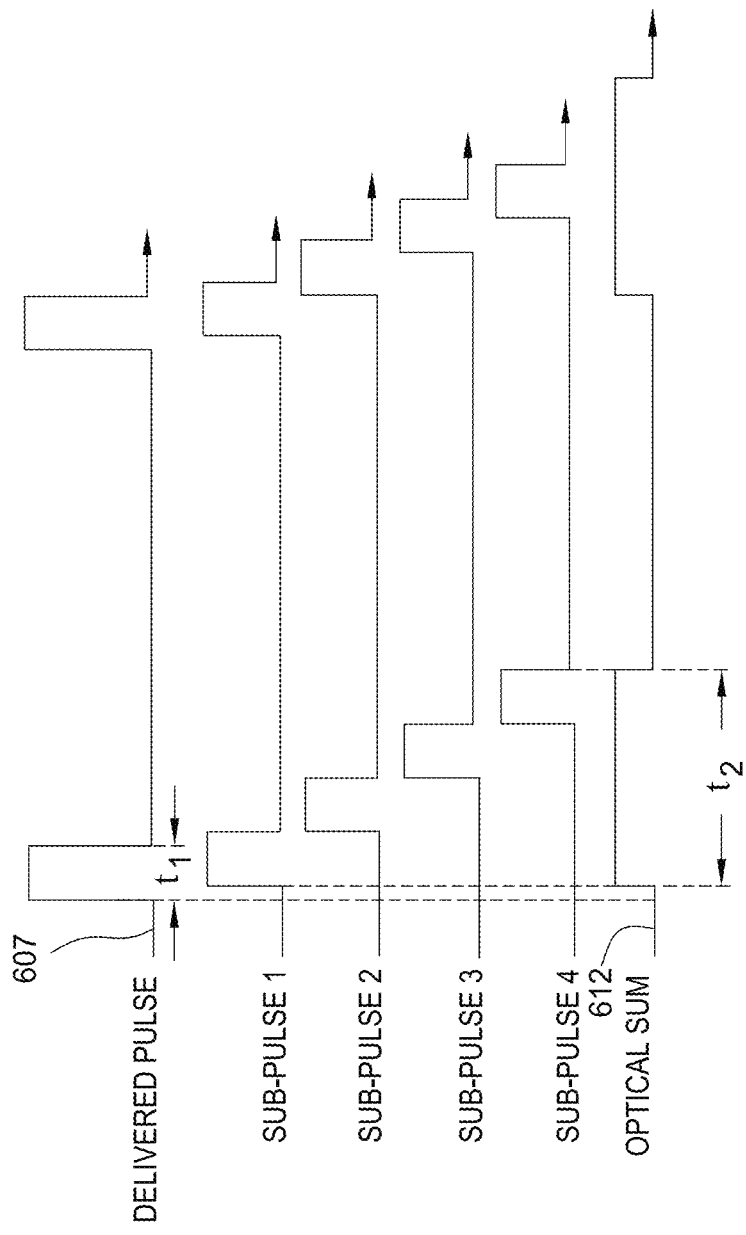
FIG. 6B illustrate graph of pulses and sub-pulses generated in a laser anneal system illustrated in FIG. 6A according to an embodiment described herein.
Figure 6C:
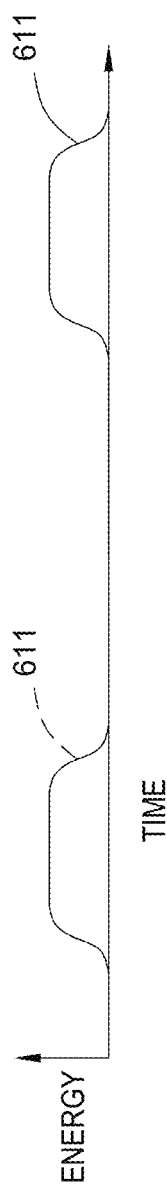
FIG. 6C illustrates the effect of delivering the pulses illustrated in FIG. 6B on a surface of the substrate described within an embodiment contained herein.

FIG. 6B illustrates an example of an energy versus time graph of various sub-pulses 1-4, for example, sub-pulses 608A, 608B, 609A, 609B that have passed through a two beam delaying region pulse stretcher assembly, which is similar to the first two beam delaying regions of the pulse stretcher illustrated in FIG. 6A. As shown in FIG. 6B, the pulse 607 delivered to the input of the pulse stretcher assembly (FIG. 6A) has a pulse width equal to period $t_1$. In this case, sub-pulse 1 is the first pulse, sub-pulse 2 is the second pulse, sub-pulse 3 is the third pulse, and sub-pulse 4 is the fourth pulse that exits the pulse stretcher assembly 406. In general, the period of each of the sub-pulses will be about $t_1$, since this property of the original pulse will remain relatively unchanged due to the pulse stretching process illustrated in FIG. 6A. Referring to FIG. 6B, it follows that sub-pulse 1 traveled the shortest distance and sub-pulse 4 will have traveled the longest distance through the pulse stretcher assembly 406. In one example, the sum of the four sub-pulses will deliver a composite energy profile 612 that is spread out over a period $t_2$, which is longer than period $t_1$ of the initial pulse. The composite energy profile 612 will also have a lower average energy per unit time than the original pulse 607. FIG. 6C illustrates a plot of the expected temperature profile of the anneal region 212 as a function of time as it is exposed to the pulse of energy delivered in the composite energy profile 612. It should be noted that depending on the transmission to reflection ratio of each of the selected beam splitters in the system, the energy of the sub-pulses may be adjusted to deliver a desired pulse profile. For example, by selecting a more transmissive, rather than reflective, combination of beam splitters the profile of the composite energy profile 612 will have a higher starting energy that will drop off towards the end of the composite profile pulse 612. It should be noted that while FIGS. 6B, 7B and 8B all illustrate rectangular shaped pulses that have the same amplitude this is not intended to be limiting as to the scope of the invention, since other pulse shapes may be used to deliver a composite energy profile 612 that has a more desirable profile.

Figure 7A:
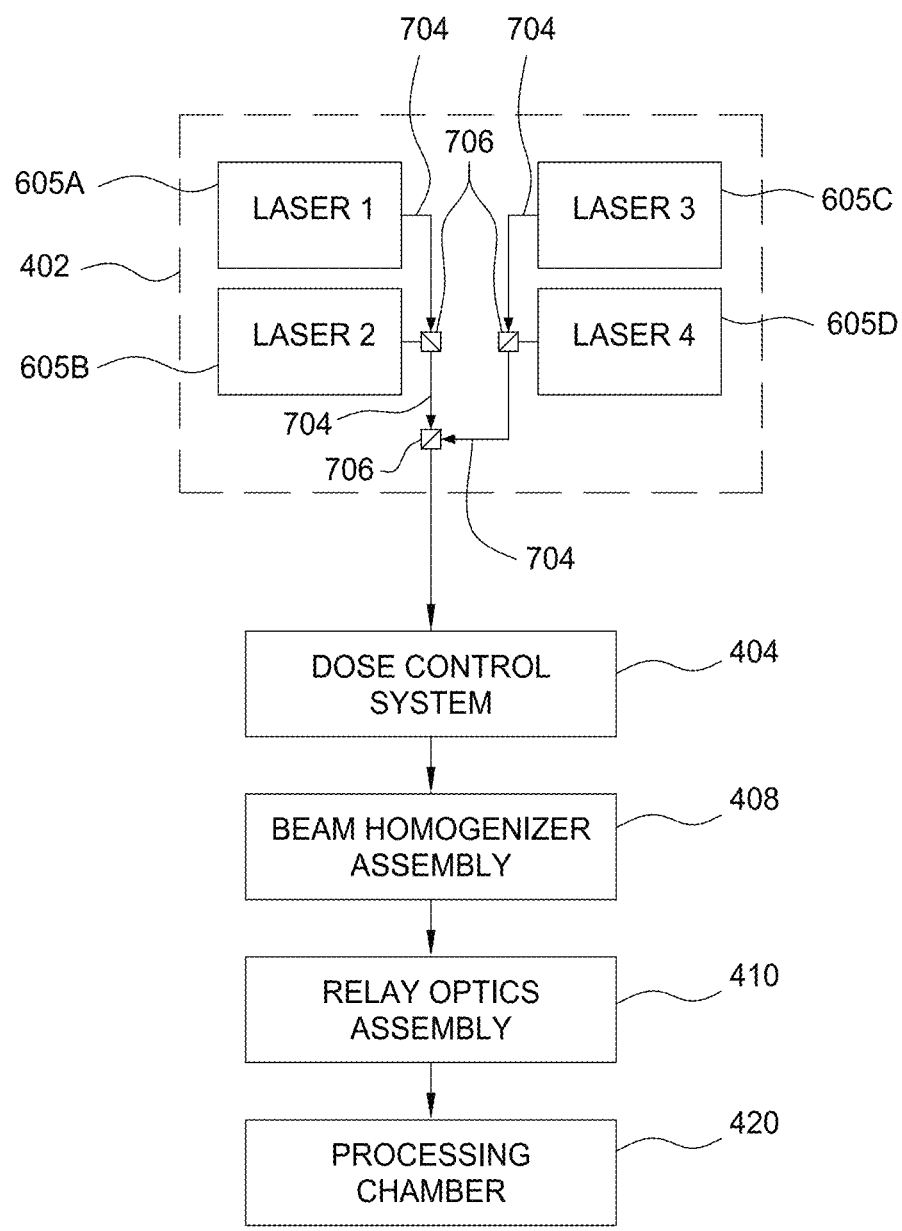
FIG. 7A illustrates a schematic view of a novel version of an energy source that is positioned within a laser anneal system according to an embodiment described herein.
Figure 8B:
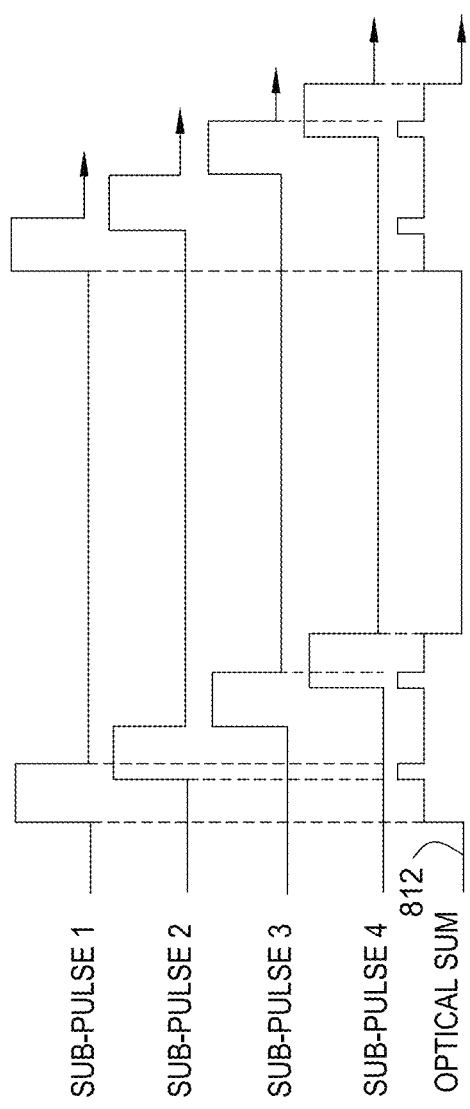
FIG. 8B illustrate graph of pulses and sub-pulses generated in a laser anneal system illustrated in FIG. 8A according to an embodiment described herein.

FIG. 7A schematically illustrates another embodiment of a optical system 220 that doesn't use a pulse stretcher assembly 406, but instead uses multiple synchronized laser sources 605A-605D to deliver an optimize the pulse profile that is delivered to the surface of the substrate. In one embodiment, energy source 402 contains a two or more energy sources, such as laser sources 605A-605D, that are adapted to deliver synchronized pulses of energy to the subsequent components in the optical system 220. In this configuration, the output 704 of each of the lasers sources can be combined using multiple beam splitters 706, mirrors (not shown), optical prisms, and/or other similar optical components that are well known in the art, to provide a composite energy profile 712 that has a more desirable profile. Therefore, by use of the system controller 430 the output of each pulse from each of the laser sources 605A-605D can be synchronized to provide a desirable composite energy profile 712. One will note that the amplitude and duration of each of the pulses delivered from each of the two or more energy sources may be adjusted to provide a composite energy profile that has desirable pulse characteristics.

As illustrated in FIGS. 7A and 7B, this configuration can utilize multiple laser sources that each deliver synchronized pulses of energy that when combined into a composite energy profile 712 creates a composite pulse that has desirable pulse characteristics, such as a desirable pulse width and profile. In one embodiment, as shown in FIG. 7B multiple lasers are each used to deliver one or more pulses that have a period $t_1$ and desirable peak energy level. As illustrated, the composite energy profile 712 created by the combination of the synchronized pulses can be adjusted to deliver a composite pulse that has a desirable profile and pulse duration ($t_2$). FIG. 7C illustrates a plot of the expected temperature profile of the anneal region 212 as a function of time that is exposed to the pulse of energy delivered in the composite energy profile 712.

Figure 8C:
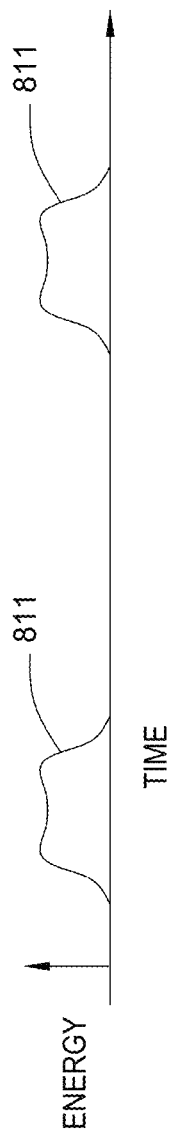
FIG. 8C illustrates the effect of delivering the pulses illustrated in FIG. 8B on a surface of the substrate described within an embodiment contained herein.

FIG. 8A schematically illustrates another embodiment of the present invention that is used to deliver a desirable pulse profile by utilizing two or more synchronized energy sources (e.g., laser sources 605A-605D) and a pulse stretcher assembly 406, which are each discussed above in conjunction with FIGS. 6A-6C and FIGS. 7A-7C. In this configuration, by use of the system controller 430 the output of each of the laser sources 605A-605D can be synchronized so that the composite pulse 812 (FIG. 8B) will have a desirable profile. The composite pulse 812 may contain a composite of each of the sub-pulses created in the pulse stretcher assembly 406 for each of the synchronized pulses delivered from each of the laser sources 605A-605B. The profile, or shape, of the composite pulse 812 shown in FIG. 8B formed from sub-pulses 1-4 is not intended to be limiting as to the scope of the invention since any pulse profile can be used to provide an optimized anneal process. FIG. 8C illustrates a plot of the expected temperature profile of the anneal region 212 as a function of time that is exposed to the pulse of energy delivered in the composite pulse 812.

Beam Homogenizer

In one embodiment, the optical system 220 contains a beam homogenizer assembly 408 that is used to improve the uniformity of the spread of the energy across the square, rectangular or other shaped "image" that is to be projected within the anneal region 212 on the surface of the substrate. The "image" as discussed above and used herein is a square, rectangular or other shaped 2-D representation of the energy per unit time delivered in a pulse. In general, the beam homogenizer assembly 408 contains various optical components, such as lenses, apertures, or other optical components that are used to correct for non-uniform elements of an "image" and thus provide a more uniform distribution energy to the annealing region 212 on the surface of the substrate. In one embodiment, the beam homogenizer assembly 408 is positioned in the optical system 220 so that it will homogenize a composite energy pulse delivered from the pulse stretcher assembly 406 and/or a composite energy pulse delivered from synchronized pulses delivered from the energy source 402. In one embodiment, in which multiple synchronized pulses are combined to form a composite pulse, such as described above in conjunction with FIGS. 7A-7C, multiple beam homogenizer assemblies 408 can be placed in each of the outputs 704 of each of the laser sources to homogenize the delivered energy before it is recombined into a composite energy profile 712 (FIG. 7B).

Conventional optical projection techniques have typically utilized a beam integrator assembly 910, which contains a pair of micro-lens arrays (e.g., reference numerals 904 and 906 in FIG. 9) and lens 908 that homogenize the energy passing through this integrator assembly. It should be noted that the term micro-lens array, or fly's-eye lens, is generally meant to describe an integral lens array that contains multiple adjacent lenses. As designed, the beam integrator assembly 910 generally works best using an incoherent source or a broad partially coherent source whose spatial coherence length is much smaller than a single micro-lens array's dimensions. In short, the beam integrator assembly 910 homogenizes the beam by overlapping magnified images of the micro-lens arrays at a plane situated at the back focal plane of the lens 908. The lens 908 should be well corrected so as minimize aberrations including field distortion. Also, the size of the image field is a magnified version of the shape of the apertures of the first microlens array, where the magnification factor is given by $F/f_1$ where $f_1$ is the focal length of the microlenses in the first micro-lens array 904 and F is the focal length of lens 908. In one example, a lens 908 that has a focal length of about 175 mm and a micro-lenses in the micro-lens array have a 4.75 mm focal length is used to form an 11 mm square field image. One will note that many different combinations for these components can be used, but generally the most efficient homogenizers will have a first micro-lens array 904 and second micro-lens array 906 that are identical. Since it is common in the beam integrator assembly 910 to position the first micro-lens array 904 and a second micro-lens array 906 a distance apart so that the energy density (Watts/mm$^2$) delivered to the first micro-lens array 904 is increased, or focused, on the second micro-lens array 906, this can cause damage to the second micro-lens array 906 when the energy density exceeds the damage threshold of the optical component and/or optical coating placed on the optical components. Typically the second micro-lens array 906 is spaced a distance $d_2$ from the first micro-lens array 904 equal to the focal length of the lenslets in the first micro-lens array 904. In one example, each the micro-lens arrays 904, 906 contains 7921 micro-lenses (i.e., 89×89 array) that are a square shape and that have an edge length of about 300 microns. The lens 908, or Fourier lens, is generally used to integrate the image received from the micro-lens arrays 904, 906 and is spaced a distance $d_3$ from the second micro-lens array 906.

In applications where coherent or partially coherent sources are used, various interference and diffraction artifacts can be problematic when using a beam integrator assembly 910, since they create high intensity regions, or spots, within the projected beam's filed of view, which can exceed the damage threshold of the various optical components. Therefore, due to the configuration of the lenses or the interference artifacts, the useable lifetime of the various optical components in the beam integrator assembly 910 and system has become a key design and manufacturing consideration.

Figure 9:
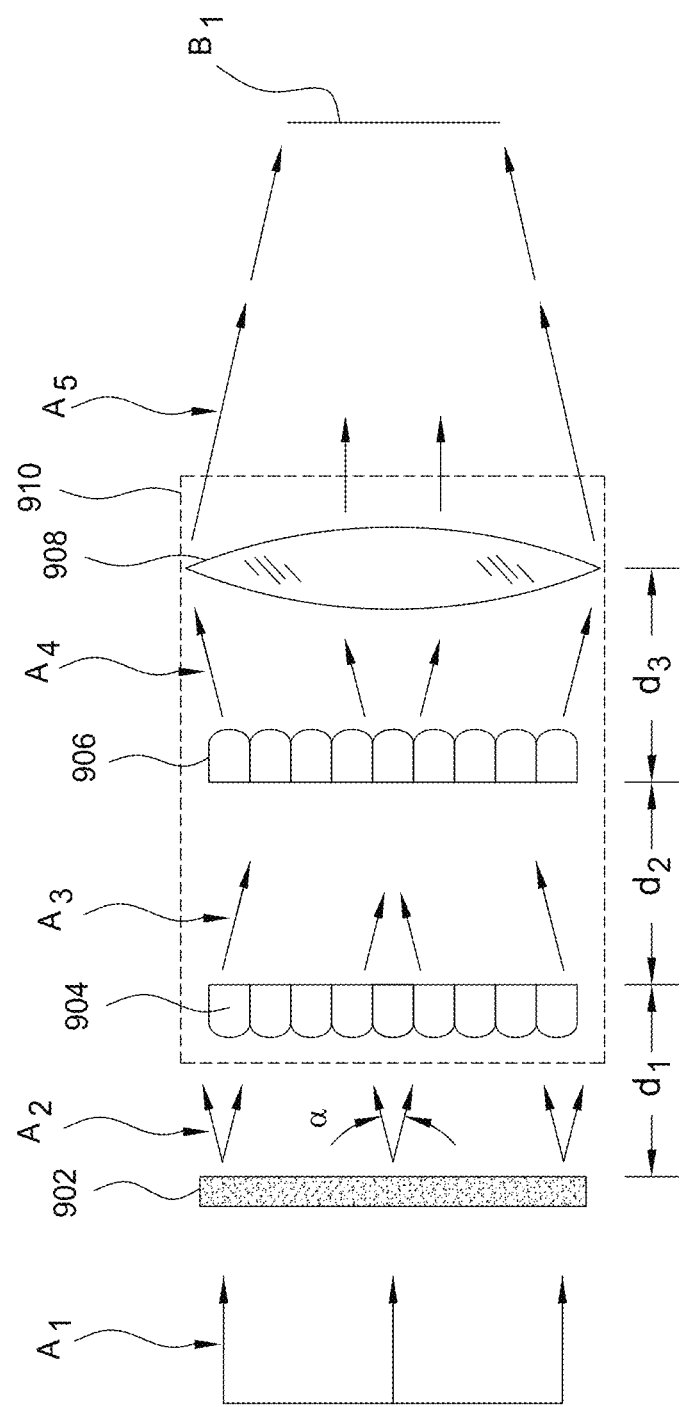
FIG. 9 illustrates a schematic side view of a beam homogenizer assembly described within an embodiment herein.

FIG. 9 schematically illustrates one embodiment in which a random diffuser 902 is placed within the beam homogenizer assembly 408 so that the uniformity of outgoing energy $A_5$ is improved in relation to the incoming energy $A_1$. In this configuration, the incoming energy $A_1$ is diffused by the placement of a random diffuser 902 prior to the energy $A_2$, $A_3$ and $A_4$ being received and homogenized by the first micro-lens array 904, second micro-lens array 906 and lens 908, respectively. The random diffuser 902 will cause the pulse of incoming energy ($A_1$) delivered from the energy source 402 to be distributed over a wider range of angles ($\alpha_1$) to reduce the contrast of the projected beam and thus improve the spatial uniformity of the pulse. The random diffuser 902 generally causes the light passing through it to spread out so that the irradiance (W/cm$^2$) of energy $A_3$ received by the second micro-lens array 906 is less than without the diffuser. The diffuser is also used to randomize the phase of the beam striking each micro-lens array. This additional random phase improves the spatial uniformity by spreading out the high intensity spots observed without the diffuser. In general, the random diffuser 902 is narrow angle optical diffuser that is selected so that it will not diffuse the received energy in a pulse at an angle greater than the acceptance angle of the lens that it is placed before. In one example, the random diffuser 902 is selected so that the diffusion angle $\alpha_1$ is less than the acceptance angle of the micro-lenses in the first micro-lens array 904 or the second micro-lens array 906. In one embodiment, the random diffuser 902 comprises a single diffuser, such as a 0.5° to 5° diffuser that is placed prior to the first micro-lens array 904. In another embodiment, the random diffuser 902 comprises two or more diffuser plates, such as 0.5° to 5° diffuser plates that are spaced a desired distance apart to further spreading out and homogenize the projected energy of the pulse delivered from the energy source 402. In one embodiment, the random diffuser 902 may be spaced a distance $d_1$ away from the first micro-lens array 904 so that the first micro-lens array 904 can receive substantially all of the energy delivered in the incoming energy $A_1$.

Quadratic Phase Error

While beam integrator assembly configurations are generally useful to help homogenize light from low energy incoherent light sources, when they are used with spatially coherent or spatially partially coherent energy sources that have a spatial coherence greater than approximately $\frac{1}{10}^{th}$ the distance between lenses, dramatic intensity fluctuations can occur at the edge of the image due to diffraction related effects. FIG. 11A is a two dimensional representation of a projected image, which is intended to pictorially illustrate the uniformity fluctuations of a non-uniform image 1101 that can be created when using a spatially coherent energy source. The variations that are illustrated by the various shades of gray clearly show that the high intensity regions 1104 (i.e., lighter shades of grey) are found near the edges 1102 while a more uniform and a lower intensity region is found near the center region 1103 of the non-uniform image 1101. FIG. 11B is a graphical representation of the intensity variation versus distance of a cross-section of the non-uniform image 1101 shown in FIG. 11A. In this example, the numerical aperture (NA) of the system is 0.00088, the magnification is 35.6, and the wavelength of the spatially coherent light is 532 nm. The representative intensity variation versus distance, or curve 1105, has been plotted using a bisecting plane that passes through the center region 1103 and through the edges 1102 of the non-uniform image 1101. The high intensity regions 1104 illustrated in FIGS. 11A and 11B, which are shown by the large peaks 1106, are believed to be created by the aberrations in the lens components, unwanted filtering effects of the optical components in the system, interference effects, and/or diffraction related effects occurring near the edge of the non-uniform image 1101. Since the goal of current pulse laser anneal processes is to provide a uniform energy field that has a uniformity of less than 5% these effects can greatly affect the usefulness of the laser anneal process. The variation in intensity seen in a real pulsed laser anneal system due to the coherent light effects can create high intensity regions near the edge that have a magnitude as high as about 20% above the mean intensity. One way to resolve this problem is to try to make the spatially coherent energy more incoherent, which is generally hard to do in practice.

Figure 10A:
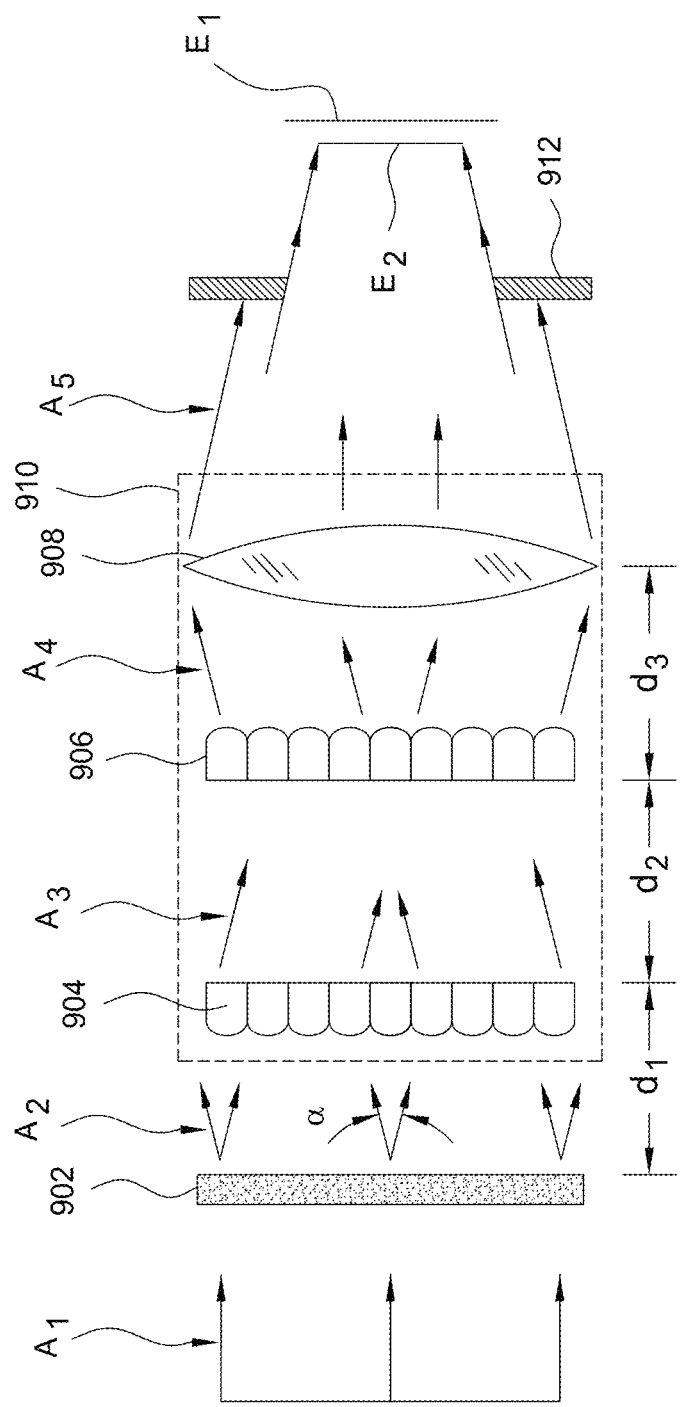
FIG. 10A illustrates a schematic side view of a beam homogenizer assembly described within an embodiment herein.

Alternately, in one embodiment, as illustrated in FIG. 10A the high intensity regions of the non-uniform image 1101 are removed by the placement of an aperture 912 within the optical path to effectively block these high intensity regions. While this method can be effective to improve the uniformity of the non-uniform image 1101 it reduces the amount energy delivered and the effective image size $E_2$ of the non-uniform image 1101 as compared to the original image size $E_1$ of the image. Adding an aperture 912 can also make the optical system 220 more complex due to the need to make the energy source larger to account for the decrease in delivered energy, the need to accurately position the aperture, the need to cool the aperture, and in some cases the need to magnify the image.

Quadratic Phase Error Beam Homogenizer

Figure 10B:
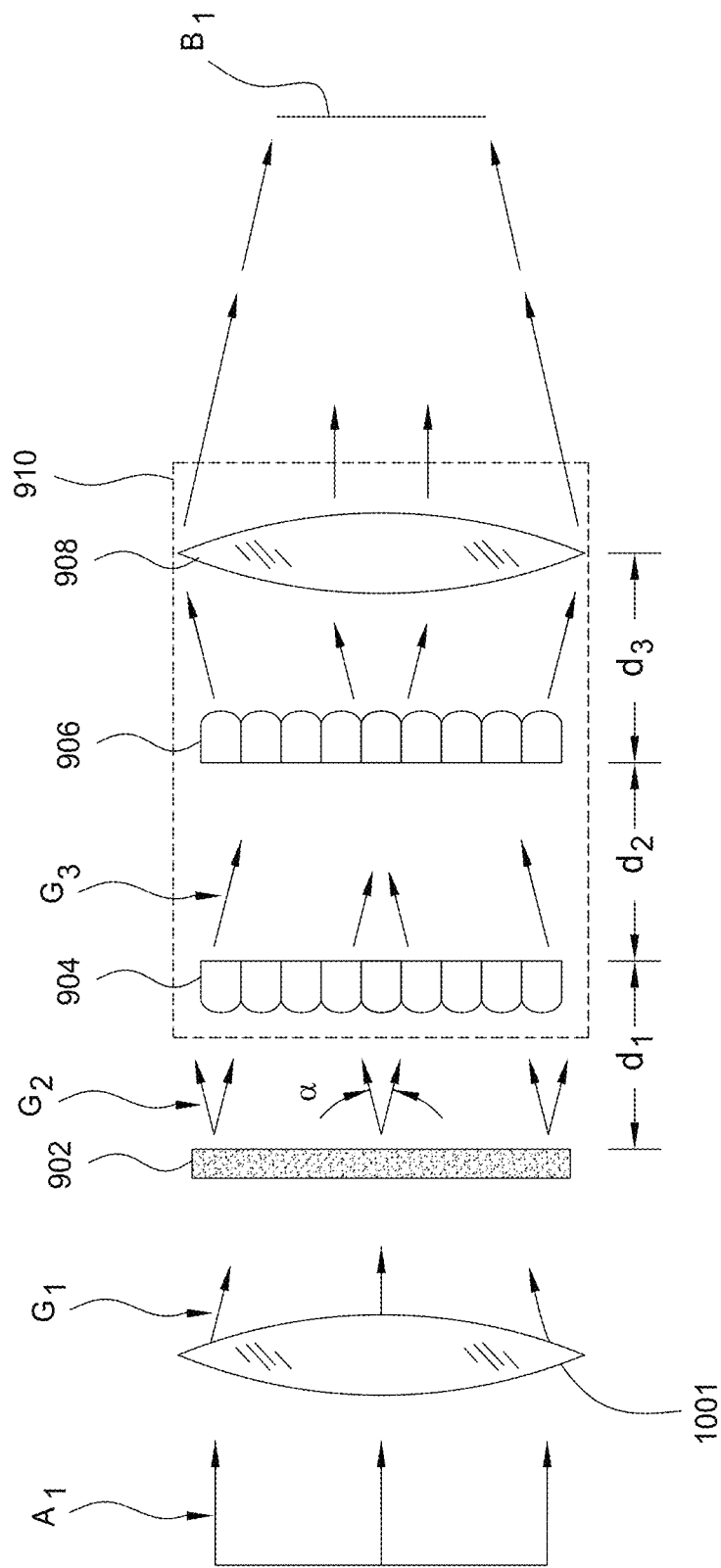
FIG. 10B illustrates a schematic side view of a beam homogenizer assembly described within an embodiment herein.

FIG. 10B illustrates another embodiment of the invention that is used to correct intensity variations at the edge and center regions of the non-uniform image 1101 shown in FIG. 11A. The image formed at the final image plane $B_1$ from a typical beam integrator assembly 910, discussed above, is the average of the images formed from each micro-lens in the micro-lens arrays 904, 906, which are in fact are nearly identical. In an uncorrected system, as shown in FIG. 9, each of the micro-lenses in the micro-lens arrays 904, 906 produces an image that has high intensity peak near the edge as shown in FIGS. 11A and 11B. In the example shown in FIGS. 11A and 11B, the first and second micro-lens arrays 904, 906 contained 2500 micro-lenses (i.e., 50×50 array) that were square shaped (e.g., edge length of about 300 microns) and a single 175 mm focal length lens 908 were used.

To minimize the areas of high intensity light near the edge of the image a correction lens 1001 that has a desired focal length is placed in front of the first micro-lens array 904. The correction lens 1001 controls the variable amount of quadratic phase, or variable aberration, to the image received (e.g., energy $G_1$, energy $G_1$+energy $G_2$) and projected (e.g., energy $G_3$) by each micro-lens in the micro-lens array 904 to adjust the sum of each of the micro-lenses received at the image plane $B_1$ so that the image is more uniform. The correction lens 1001 adjusts the image projected by each micro-lens in the micro-lens arrays so that the sum of all the lenses will improve the uniformity of the composite image. In one embodiment, the correction lens 1001 is used to reduce the intensity fluctuations near the edge of the projected image. Part of this correction of the composite image is due to the adjusted variation in the spatial frequency spectrum, or quadratic phase, of the light received by each of the micro-lenses in the micro-lens array.

In one embodiment, the amount of quadratic phase added for the micro-lens near the center of the micro-lens array 904 is small, while the amount of quadratic phase added to the micro-lens near the edge of the micro-lens array 904 is large. Thus, the image formed by the image projected through the center of the correction lens and center of the micro-lens array is approximately the same as if no correction lens 1001 is in place, while the image at the edges will have significantly more changes from the uncorrected shape. In one embodiment, each micro-lens in the micro-lens array sees a variable amount of quadratic phase depending on its position within the micro-lens array and thus the projected image for each micro-lens in the micro-lens array 904 is slightly changed due to the differing curvature of the light received from the corrective lens 1001.

Figure 11C:
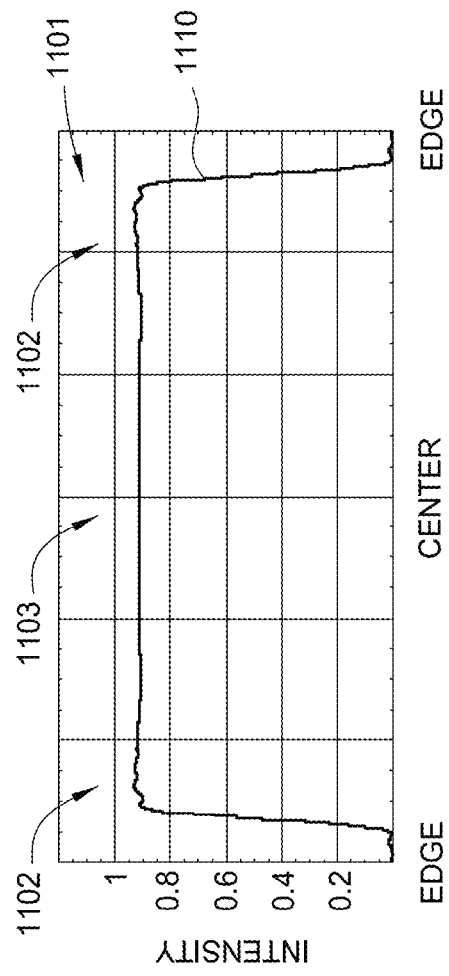
FIG. 11C illustrates a graph of the intensity versus distance across the corrected image illustrated in FIG. 11D described within an embodiment herein.
Figure 11D:
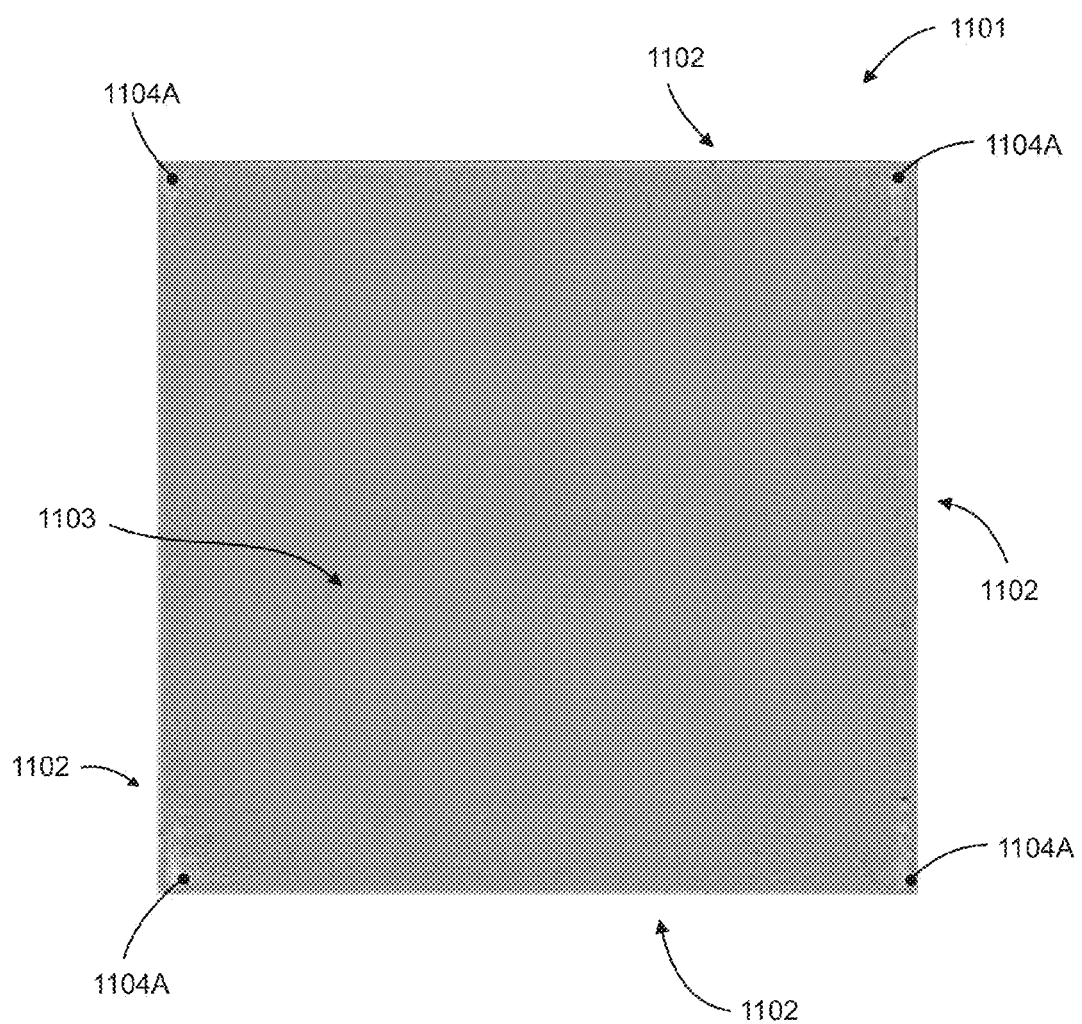
FIG. 11D illustrates an corrected image described within an embodiment herein.
Figure 11E:
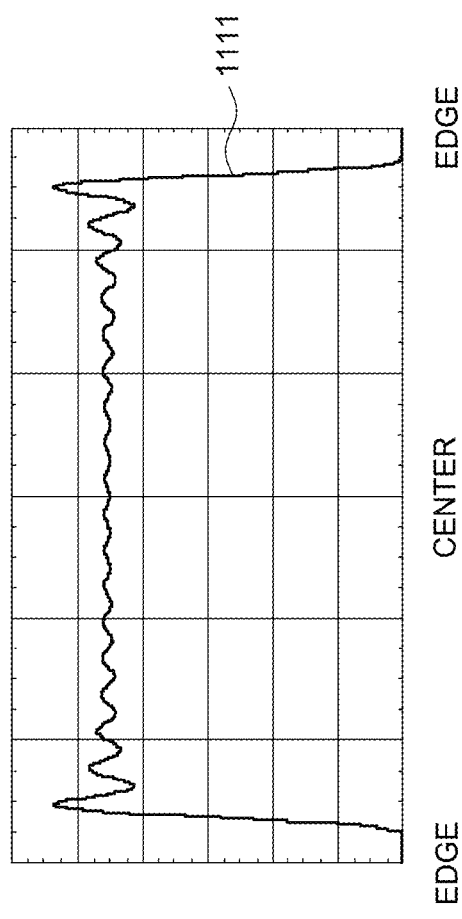
FIG. 11E illustrates a graph of the intensity versus distance across the image formed by a micro-lens that is at the center of a first micro-lens array illustrated in FIG. 10B described within an embodiment herein.
Figure 11F:
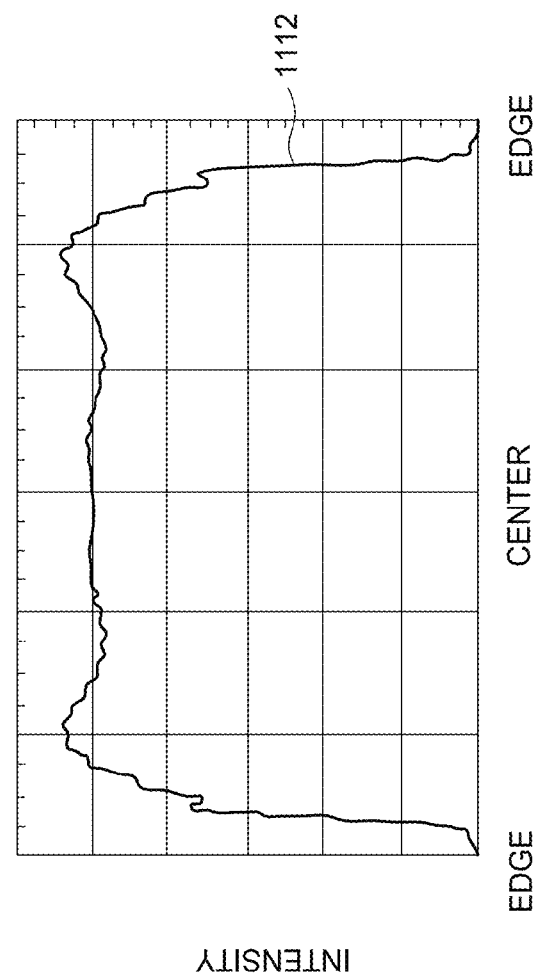
FIG. 11F illustrates a graph of the intensity versus distance across the image formed by a micro-lens that is at the edge of a first micro-lens array illustrated in FIG. 10B described within an embodiment herein.

FIGS. 11E and 11F illustrate an example of how the shape of the intensity versus distance across the lens of a projected image from a micro-lens positioned at the center and edge of the micro-lens array 904, respectively, due to the addition of the correction lens 1001. The image formed by a micro-lens positioned at the center of the micro-lens array 904 and the center of the correction lens 1001 will produce an image that is approximately the same as that formed if no correction lens was placed before the micro-lens arrays. For example, the curve 1105 in FIG. 11B and curve 1111 in FIG. 11E are very similar, since the image represented in FIG. 11B is the sum of all the uncorrected identical images projected by each micro-lens in the micro-lens array. However, in one example the images formed by micro-lenses near the edge of the micro-lens arrays (see curve 1112 in FIG. 11F) will produce fewer ripples and tend to have an intensity that drops off more rapidly than the center micro-lenses. In one embodiment, the correction lens 1001 is selected and positioned so that the projected image by each micro-lens will gradually vary for each micro-lens that is in between the center and the edge of the micro-lens array.

In one embodiment, micro-lenses in the micro-lens array that are spaced an equal distance from a symmetric axes of the correction lens, such as the center of a spherical shaped correction lens will each have similarly shaped intensity peaks across the projected image. For example, for each micro-lens that is positioned an equal distance from the symmetric axis of the correction lens in a square micro-lens array will generally project the same shaped image.

By selecting a correction lens 1001 that has a proper focal length and lens shape based on the wavelength of the light, spatial coherence of the light, numerical aperture of the micro-lenses, the number of micro-lenses in the micro-lens arrays, and focal length of the micro-lens arrays, the corrected image produced will be more uniform due to the blending of the peaks and valleys created by the corrected image projected by each of the micro-lenses in the micro lens array. For example, a more uniform composite image is formed by the summation of the high intensity peaks produced by some micro-lenses with low intensity peaks generated by others. It is believed that by increasing the number of micro-lenses in the micro-lens arrays the longer the focal length the correction lens 1001 would likely need to be to effectively correct for the high intensity peaks at the edge of the corrected image 1108. The careful balancing of quadratic phase change due to the properties of the various lens in the beam homogenizer, such as focal length of the various lenses (e.g., corrective lens), will lead to a more uniform image with very little loss of transmitted energy.

FIG. 11D illustrates a corrected image 1108 that is formed by adding the correction lens 1001 into the optical path before the first micro-lens array 904. In one example, the correction lens 1001 is a single 200 mm focal length lens that is placed roughly 50 mm in front of the micro-lens array 904 that contains 2500 micro-lenses that are a square shape and have an edge length of about 300 microns. The focal length of a desirable correction lens will have focal length that does not increase the angle too much for the homogenizer to accommodate, but has a focal length long enough to introduce enough phase shift to provide a desirable uniformity. The desired focal length is a function of the acceptance angle of the homogenizer, which is related to the aperture size of the micro-lenses in the second micro-lens array 906 divided by two times the focal length of the first micro-lens array 904. The correction lens can be placed before (shown in FIG. 10B) or after (not shown) the random diffuser 902 in the optical path if it is needed, but before the first micro-lens array 904. One will note that the high intensity regions 1104 seen in FIG. 11A have almost all been removed in FIG. 11D (see reference numerals 1104A) by the addition of the correction lens 1001.

FIG. 11C is a graphical representation of the intensity variation versus distance of a cross-section of the corrected image 1108 shown in FIG. 11D. The representative intensity variation versus distance, or curve 1109, has been plotted using a bisecting plane that passes through the center region 1103 and through the edges 1102 of the corrected image 1108. The high intensity regions 1104 found at the edges 1102 of the curve 1110 in FIG. 11B have been removed in FIG. 11C.

Theoretically, it is possible to calculate the intensity pattern at the back focal plane of the long focal length lens 908; however, the presence of the random diffuser 902 makes this difficult. In any case, it is believed that the theoretical output intensity across the corrected image 1108 can be found by using equation (1).

$$I(x, y) = \sum_{k=1}^{K} \sum_{l=1}^{L} \left| \sum_{m=1}^{M} \sum_{n=1}^{N} \int_{-\frac{NA}{\lambda}}^{\frac{NA}{\lambda}} \int_{-\frac{NA}{\lambda}}^{\frac{NA}{\lambda}} \left( \int_{dm\frac{a}{2}}^{m\frac{a}{2}} \int_{-n\frac{a}{2}}^{n\frac{a}{2}} H_{kl}(x, y) e^{i\phi(x,y)} e^{i\pi\left(\frac{x^2}{\lambda f}+\frac{y^2}{\lambda f}\right)} e^{i2\pi(x\xi+yn)} dx\,dy \right) d\xi\,d\eta \right|^2 \quad (1)$$

$$H_{kl}(x, y) = H_k\left(\frac{\sqrt{2}\,x}{\omega}\right) H_l\left(\frac{\sqrt{2}\,y}{\omega}\right) e^{\frac{-(x^2+y^2)}{\omega^2}} \quad (2)$$

$$e^{i\phi(x,y)} \quad (3)$$

$$e^{i\pi\left(\frac{x^2}{\lambda f}+\frac{y^2}{\lambda f}\right)} \quad (4)$$

$$e^{i2\pi(x\xi+y\eta)} \quad (5)$$

The function $H_{kl}(x, y)$ illustrated in equation (2) is the familiar Hermite polynomials that describe the laser beam, the function illustrated in equation (3) is the phase factor imposed on the beam by the random diffuser 902, the function illustrated in equation (4) is the quadratic phase factor added to the beam by the lens 908 and the function illustrated in equation (5) is the Fourier transform kernal, where $\lambda$ is the wavelength, f is the focal length, $\omega$ is the frequency of the light, X is the position in one direction across the image, and Y is the position in another direction across the image. The inner integrals over variables X and Y represent the field produced at the exit of a single micro-lens in the micro-lens arrays that is square shaped and has edge length equal to "a." The outer integrals over $\xi$ and $\eta$ are used to calculate the intensity at the final image plane including the spatial filtering effect of the finite numerical aperture (NA) of the system and wavelength ($\lambda$). To achieve the overall intensity one must then sum the fields for all micro-lenses illuminated by summing over indices m and n to find the field due to a single Hermite-Gaussian mode. Squaring the absolute value of the sum produces the intensity pattern due to a single Hermite-Gaussian mode. Finally summing over all Hermite-Gaussian modes produces the intensity pattern produced at the final image plane including the effects of the random diffractive diffuser and the focusing lens. This equation does not include the effect of system magnification since it is assumed to be unity, but could be done by scaling the output field and the focusing lens focal length by the magnification factor.

Relay Optics

In one embodiment, the optical system 220 contains a relay optics assembly 410 that contains a group of optical components that are used to direct the image that is passed from the up-stream components in optical system 220 to the surface of the substrate that is positioned on the substrate supporting surface 216 (FIG. 4) positioned in the laser anneal processing chamber 420. In general, the relay optics assembly 410 contains a number of mirrors, lenses and other common optical components that allow the position, orientation and size of the image to be set so that it fills the annealing region 212 on the surface of the substrate.

It should be noted that the order of the components found in the optical system 220 and illustrated in FIGS. 4, 5, 6A, 7A and 8A are not intended to be limiting as to the scope of the invention, since it may be desirable to reposition one or more of the components without affecting the functionality of the system. In another embodiment, one or more of the components illustrated in FIGS. 4, 5, 6A, 7A, and 8A, such as the relay optics assembly 410 may be removed from the optical system 220 to reduce cost or system complexity without varying from the basic scope of the invention.

While the foregoing is directed to embodiments of the present invention, other and further embodiments of the invention may be devised without departing from the basic scope thereof, and the scope thereof is determined by the claims that follow.

The invention claimed is:

1. An apparatus for thermally processing a substrate, comprising:
    a plurality of energy sources, wherein each energy source is adapted to deliver an energy pulse;
    a first micro-lens array having a plurality of micro-lenses that are adapted to receive at least a portion of each energy pulse;
    a second micro-lens array having a plurality of micro-lenses that are adapted to receive at least a portion of the energy transmitted from the first micro-lens array;
    a first lens that is positioned to receive at least a portion of the energy transmitted from the micro-lenses in the second micro-lens array and transmit the energy received from the second micro-lens array to one or more components that are used to direct the energy received to a surface of the substrate; and
    a variable aberration control lens that is positioned to receive at least a portion of each energy pulse and project an image to the first micro-lens array from the received energy pulses, wherein the variable aberration control lens is configured to reduce an intensity variation between an edge of the image relative to a center of the image by reducing a first intensity at the edge of the image relative to a second intensity at the center of the image.

2. The apparatus of claim 1, wherein the plurality of energy sources comprises three energy sources.

3. The apparatus of claim 1, further comprising a controller operable to synchronize the energy pulses to deliver a composite energy pulse.

4. The apparatus of claim 3, wherein the composite energy pulse has a pulse width greater than a pulse width of any of the energy pulses from the plurality of energy sources.

5. The apparatus of claim 4, further comprising a diffuser that is positioned to receive at least a portion of the composite energy pulse and transmit the at least a portion of the composite energy pulse towards the first micro-lens array.

6. The apparatus of claim 1, wherein the variable aberration control lens causes a higher amount of quadratic phase to be added for micro-lenses at an edge of the first micro-lens array than for micro-lenses at a center of the first micro-lens array.

7. The apparatus of claim 1, wherein the plurality of energy sources are spatially coherent energy sources.

8. The apparatus of claim 1, wherein the variable aberration control lens is a spherical lens.

9. An apparatus for thermally processing a substrate, comprising:
- an energy source assembly that has an output that is adapted to deliver a first energy pulse;
- a first micro-lens array having a plurality of micro-lenses that are adapted to receive at least a portion of the first energy pulse;
- a second micro-lens array having a plurality of micro-lenses that are adapted to receive at least a portion of the energy transmitted from the first micro-lens array;
- a first lens that is positioned to receive at least a portion of the energy transmitted from the micro-lenses in the second micro-lens array and transmit the energy received from the second micro-lens array to one or more components that are used to direct the energy received to a surface of the substrate;
- a variable aberration control lens that is positioned to receive at least a portion of the first energy pulse and project an image to the first micro-lens array from the received first energy pulse, wherein the variable aberration control lens is configured to reduce an intensity variation between an edge of the image relative to a center of the image by reducing a first intensity at the edge of the image relative to a second intensity at the center of the image; and
- a diffuser that is positioned to receive at least a portion of the first energy pulse and transmit the at least a portion of each energy pulse towards the first micro-lens array.

10. The apparatus of claim 9, wherein the diffuser has a diffusion angle less than or equal to an acceptance angle of the micro-lenses in the first micro-lens array.

11. The apparatus of claim 9, wherein the diffuser has a diffusion angle less than or equal to an acceptance angle of the micro-lenses in the second micro-lens array.

12. The apparatus of claim 9, wherein the diffuser has a diffusion angle of between about 0.5° to 5°.

13. The apparatus of claim 9, wherein the diffuser is positioned between the variable aberration control lens and the first micro-lens array.

14. The apparatus of claim 9, wherein the energy source assembly comprises three or more lasers, wherein each laser is operable to deliver a portion of the first energy pulse.

15. The apparatus of claim 9, wherein the variable aberration control lens causes a higher amount of quadratic phase to be added for micro-lenses at an edge of the first micro-lens array than for micro-lenses at a center of the first micro-lens array.

16. An apparatus for thermally processing a substrate, comprising:
- an energy source assembly that has an output that is adapted to deliver a first energy pulse;
- a first micro-lens array having a plurality of micro-lenses that are adapted to receive at least a portion of the first energy pulse;
- a second micro-lens array having a plurality of micro-lenses that are adapted to receive at least a portion of the energy transmitted from the first micro-lens array;
- a first lens that is positioned to receive at least a portion of the energy transmitted from the micro-lenses in the second micro-lens array and transmit the energy received from the second micro-lens array to one or more components that are used to direct the energy received to a surface of the substrate; and
- a variable aberration control lens that is positioned to receive at least a portion of the first energy pulse and project an image to the first micro-lens array from the received first energy pulse, wherein the variable aberration control lens is configured to reduce an intensity variation between an edge of the image relative to a center of the image by reducing a first intensity at the edge of the image relative to a second intensity at the center of the image.

17. The apparatus of claim 16, wherein an amount of quadratic phase received from the variable aberration control lens at a micro-lens in the first micro-lens array is greater for a micro-lens at the edge of the first micro-lens array than for a micro-lens at the center of the first micro-lens array.

18. The apparatus of claim 16, wherein an amount of quadratic phase added by the variable aberration control lens for each micro-lens increases for each micro-lens from the center of the first micro-lens array to the edge of the first micro-lens array.

19. The apparatus of claim 16, further comprising a diffuser positioned before the first micro-lens array.

20. The apparatus of claim 16, wherein the energy source assembly comprises three or more lasers, wherein each laser is operable to deliver a portion of the first energy pulse.

* * * * *